United States Patent
Hall et al.

(10) Patent No.: US 9,499,699 B1
(45) Date of Patent: Nov. 22, 2016

(54) HIGH DURABILITY SOLAR ABSORPTIVE COATING AND METHODS FOR MAKING SAME

(71) Applicant: Sandia Corporation, Albuquerque, NM (US)

(72) Inventors: Aaron C. Hall, Albuquerque, NM (US); David P. Adams, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 114 days.

(21) Appl. No.: 14/632,838

(22) Filed: Feb. 26, 2015

Related U.S. Application Data

(60) Provisional application No. 61/945,407, filed on Feb. 27, 2014.

(51) Int. Cl.

| | |
|---|---|
| *F21V 9/04* | (2006.01) |
| *F21V 9/06* | (2006.01) |
| *G02B 5/22* | (2006.01) |
| *G02B 5/26* | (2006.01) |
| *C09D 5/32* | (2006.01) |
| *C23C 14/22* | (2006.01) |
| *C23C 14/06* | (2006.01) |
| *C23C 14/08* | (2006.01) |
| *C23C 16/44* | (2006.01) |
| *C23C 16/40* | (2006.01) |
| *C23C 14/34* | (2006.01) |
| *C23C 14/35* | (2006.01) |
| *B05D 5/06* | (2006.01) |
| *B05D 3/00* | (2006.01) |
| *C08J 7/18* | (2006.01) |
| *G21H 5/00* | (2006.01) |

(52) U.S. Cl.
CPC ............. *C09D 5/32* (2013.01); *C23C 14/0688* (2013.01); *C23C 14/08* (2013.01); *C23C 14/22* (2013.01); *C23C 14/34* (2013.01); *C23C 14/35* (2013.01); *C23C 16/40* (2013.01); *C23C 16/44* (2013.01)

(58) Field of Classification Search
USPC .......... 126/676; 205/923; 252/587; 427/162, 427/186, 508, 554, 586, 596
See application file for complete search history.

(56) References Cited

U.S. PATENT DOCUMENTS

| | | | |
|---|---|---|---|
| 4,988,538 A | | 1/1991 | Horvei et al. |
| 5,112,698 A | * | 5/1992 | Horvei ...................... C23C 4/18 |
| | | | 428/472 |
| 5,360,491 A | * | 11/1994 | Carey ............... H01L 31/02168 |
| | | | 136/256 |

(Continued)

FOREIGN PATENT DOCUMENTS

EP    0 246 003 A2    11/1987

OTHER PUBLICATIONS

Ambrosini A et al., "High temperature solar selective coatings for solar power central receivers,"*ASME 7th Int'l Conf. on Energy Sustainability*, held on Jul. 14-19, 2013 in Minneapolis, MN (18 pages).

(Continued)

*Primary Examiner* — Bijan Ahvazi
(74) *Attorney, Agent, or Firm* — Helen S. Baca

(57) ABSTRACT

The present invention relates to solar absorptive coatings including a ceramic material. In particular, the coatings of the invention are laser-treated to further enhance the solar absorptivity of the material. Methods of making and using such materials are also described.

18 Claims, 17 Drawing Sheets

(56) References Cited

U.S. PATENT DOCUMENTS

| | | | |
|---|---|---|---|
| 5,425,860 A * | 6/1995 | Truher | C23C 14/0635 136/258 |
| 8,893,711 B2 | 11/2014 | Kennedy | |
| 2010/0313875 A1 | 12/2010 | Kennedy | |
| 2013/0087952 A1* | 4/2013 | Wang | C23C 24/10 264/497 |

OTHER PUBLICATIONS

Ambrosini A et al., "High-temperature solar selective coating development for power tower receivers," *SunShot Concentrating Solar Power (CSP) Program Review*, held Apr. 23-25, 2013 near Phoenix, AZ (21 pages, presentation).

Ambrosini A et al., "Improved high temperature solar absorbers for use in concentrating solar power central receiver applications," *ASME 5th Int'l Conf. on Energy Sustainability*, held on Aug. 7-10, 2011 in Washington, DC (21 pages, presentation).

Ambrosini A et al., "Improved high temperature solar absorbers for use in concentrating solar power central receiver applications," *ASME 5th Int'l Conf. on Energy Sustainability*, held on Aug. 7-10, 2011 in Washington, DC (21 pages, proceeding).

Ambrosini A et al., "Improved high temperature solar absorbers for use in concentrating solar power central receiver applications," *Sandia Report SAND2010-7080* (Oct. 2010), 43 pages.

Bayón R et al., "Preparation of selective absorbers based on CuMn spinels by dip-coating method," *Renew. Energy* 2008;33(2):348-53.

Boden SA et al., "Tunable reflection minima of nanostructured antireflective surfaces," *Appl. Phys. Lett.* 2008;93:133108 (3 pages).

Brown RJC et al., "The physical and chemical properties of electroless nickel-phosphorus alloys and low reflectance nickel-phosphorus black surfaces," *J. Mater. Chem.* 2002;12:2749-54.

Céspedes E et al., "Novel Mo—$Si_3N_4$ based selective coating for high temperature concentrating solar power applications," *Sol. Energy Mater. Sol. Cells* 2014;122:217-25.

Cindrella L, "The real utility ranges of the solar selective coatings," *Sol. Energy Mater. Sol. Cells* Dec. 2007;91(20):1898-1901.

Haberfehlner G et al., "Selenium segregation in femtosecond-laser hyperdoped silicon revealed by electron tomography," *Microsc. Microanal.* Jun. 2013;19(3):716-25.

Hall A et al., "Solar selective coatings for concentrating solar power central receivers." *Adv. Mater. Process.* Jan. 2012;170(1):28-32.

Hall A et al., "The effect of a simple annealing heat treatment on the mechanical properties of cold-sprayed aluminum," *J. Thermal Spray Technol.* Jun. 2006;15(2):233-8.

Ho CK et al., "Characterization of Pyromark 2500 for high-temperature solar receivers," *Proc. ASME 2012 Energy Sustainability and Fuel Cell Conference*, held on Jul. 23-26, 2012 in San Diego, CA, Paper No. ES2012-91374, pp. 509-518.

Ho CK et al., "Characterization of Pyromark 2500 paint for high-temperature solar receivers," *J. Sol. Energy Eng.* Jul. 2013;136(1):014502 (4 pages).

Ho CK et al., "Review of high-temperature central receiver designs for concentrating solar power," *Renewable Sustainable Energy Rev.* 2014;29:835-46.

Jiang SP, "Activation, microstructure, and polarization of solid oxide fuel cell cathodes," *J. Solid State Electrochem.* 2007;11:93-102.

Jiang SP, "Development of lanthanum strontium manganite perovskite cathode materials of solid oxide fuel cells: a review," *J. Mater. Sci.* Nov. 2008;43(21):6799-833.

Kaluža L et al., "Sol-gel derived $CuCoMnO_x$ spinel coatings for solar absorbers: Structural and optical properties," *Sol. Energy Mater. Solar Cells* 2001;70(2):187-201.

Kennedy CE et al., "Progress in development of high-temperature solar-selective coating," *Proc. ISEC2005, 2005 Int'l Solar Energy Conf.*, held on Aug. 6-12, 2005 in Orlando, FL, 7 pages.

Kennedy CE, "Review of mid- to high-temperature solar selective absorber materials," *National Renewable Energy Laboratory Technical Report NREL/TP-520-31267* (Jul. 2002), 58 pages.

Kussmaul M et al., "Ion beam treatment of potential space materials at the NASA Lewis Research Center," *Surf. Coatings Technol.* Apr. 1992;51(1-3):299-306.

Nejati M, "Cermet based solar selective absorbers; further selectivity improvement and developing new fabrication technique," *Dr.-Ing. Dissertation for the Universität des Saarlandes*, 2008, 190 pages (full text accessible at http://scidok.sulb.uni-saarland.de/volltexte/2009/2275/) (only abstract provided, 2 pages).

Selvakumar N. et al., "Review of physical vapor deposited (PVD) spectrally selective coatings for mid- and high-temperature solar thermal applications," *Solar Energy Mater. Solar Cells* Nov. 2012;98:1-23.

Sulzer-Metco Inc., Datasheet for "Lanthanum Strontium Manganite (LSM) Powder," Document No. DSMTS-0024.2 (2012), 3 pages.

Sulzer-Metco Inc., "Thermal spray materials guide," (May 2012), 52 pages.

Sun C-H et al., "Broadband moth-eye antireflection coatings on silicon," *Appl. Phys. Lett.* 2008; 92:061112 (3 pages).

Tsukamoto M et al., "Periodic microstructures produced by femtosecond laser irradiation on titanium plate," *Vacuum* Sep. 2006;80(11-12):1346-50.

Wijewardane S et al., "A review on surface control of thermal radiation by paints and coatings for new energy applications," *Renewable Sustainable Energy Rev.* 2012;16:1863-73.

Zhang QC, "Recent progress in high-temperature solar selective coatings," *Solar Energy Mater. Solar Cells* 2000;62:63-74.

* cited by examiner

HIGH DURABILITY SOLAR ABSORPTIVE COATING AND METHODS FOR MAKING SAME

CROSS-REFERENCE TO RELATED APPLICATION

This application claims the benefit of U.S. Provisional Application No. 61/945,407, filed Feb. 27, 2014, which is hereby incorporated by reference in its entirety.

STATEMENT OF GOVERNMENT INTEREST

This invention was made with Government support under contract no. DE-AC04-94AL85000 awarded by the U.S. Department of Energy to Sandia Corporation. The Government has certain rights in the invention.

FIELD OF THE INVENTION

The present invention relates to high durability solar absorptive coatings, as well as methods of making such coatings. In particular, the coatings include a ceramic oxide that is laser-treated to form a solar absorptive nanostructure. Methods of making and using such coatings are also described.

BACKGROUND OF THE INVENTION

Concentrating solar power (CSP) systems represent a zero emission method to convert sunlight into electricity. Generally, CSP systems use an array of mirrors to heat a working fluid by concentrating sunlight on the surface of a heat exchanger. These heat exchangers require durable surfaces, capable of extended operation in air at temperatures in excess of 700° C., with high absorptivity and low emissivity in the solar spectrum.

Furthermore, a CSP receiver surface will experience daily thermal cycles as the sun rises and sets. Abrupt temperature changes will occur as clouds transit the mirror array. The receiver surface will be exposed to air, wind, dirt, and precipitation year around. Economical operation of the CSP system requires that the CSP receiver surface properties remain stable for the heat exchanger's lifetime (~30 years). Pyromark®-2500, a leading solar absorptive coating, exhibits high solar absorptivity but has limited durability as it is based on an organic resin. Accordingly, there is a need for materials capable of functioning at high operating temperatures (e.g., more than 700° C.) and forming durable coatings.

SUMMARY OF THE INVENTION

The present invention relates to durable coatings having high solar absorptivity. In particular, the coating includes a laser-treated material (e.g., ceramic material). Herein, characterization of thermal sprayed chrome oxide ($Cr_2O_3$) and lanthanum strontium manganite (LSM) coatings, modified using a laser surface treatment, is discussed. Laser surface treatment was used to improve both coatings' solar performance. In particular embodiments, laser-treated chrome oxide coatings exhibited a figure of merit of 0.889, and laser-treated lanthanum strontium manganite coatings exhibit a figure of merit of 0.892. This is significant because these figures of merit are similar to Pyromark®-2500 (FOM=0.89), the leading solar absorptive coating. Because chrome oxide and lanthanum strontium manganite are both a high temperature ceramic ($Cr_2O_3$ $T_m$=2435° C.; LSM $T_m$~1000° C.), they are expected to be significantly more durable at high temperature than organic based Pyromark®-2500. These data strongly suggest that laser-treated ceramic coatings have high potential for concentrating solar power systems.

Furthermore, without wishing to be limited by mechanism, analysis of the coating surfaces shows that laser-treatment created unique nanostructures on each surface. These nanostructures are significantly smaller than the wavelength of light in the solar spectrum and could easily scatter photons resulting in improved solar absorption.

Accordingly, the invention features a method of forming a solar absorptive coating on a surface, the method including: applying a material (e.g., a ceramic material) to the surface to form a coated surface; and treating the coated surface with a pulsed laser source, thereby forming the solar absorptive coating on the surface.

In some embodiments, the method includes curing the ceramic material on the coated surface (e.g., where the curing step occurs prior to the treating step).

In some embodiments, the method includes re-treating the solar absorptive coating with a pulsed laser source (e.g., where the re-treating step occurs after the treating step). In further embodiments, this re-treating step is performed periodically (e.g., every month, every 3 months, every 6 months, every year, every two years, every five years, etc.).

In some embodiments, the ceramic material is a ceramic oxide, a dielectric, or a cermet (e.g., any described herein). Exemplary ceramic materials include a ceramic oxide, such as a chromium oxide, lanthanum-based perovskite, manganese cobalt oxide, silicon oxide, cerium oxide, zinc oxide, aluminum oxide, magnesium oxide, titanium oxide, strontium oxide, zirconium oxide, hafnium oxide, vanadium oxide, nickel oxide, and indium oxide, optionally including one or more dopants (e.g., Sr, Mg, Ca, Ba, Ni, Ru, silicate, Ga, etc.); a material having a perovskite structure (e.g., any described herein); a dielectric; a cermet, such as an alumina-based cermet, a magnesium zirconate-based cermet, a magnesium oxide-based cermet (e.g., Au—MgO), a chromium oxide-based cermet (e.g., Cr—$Cr_2O_3$ or Mo—$Cr_2O_3$), a nickel-based cermet (e.g., Ni—ZnS (also known as black nickel), Ni—$NiO_x$, or Ni—$MgF_2$), a cobalt-based cermet (e.g., Co—$Co_3O_4$), a molybdenum-based cermet (e.g., Mo—$MoO_2$ or Mo—AlN), a tungsten-based cermet (e.g., W—$WO_x$ or W—AlN), a titanium-based cermet (e.g., $TiN_xO_y$); and composites or blends of any of these.

In some embodiments, the solar absorptive coating has a solar absorptance of greater than about 0.9 (e.g., greater than about 0.91, 0.92, 0.93, 0.94, 0.95, 0.96, 0.97, 0.98, or greater). In other embodiments, the solar absorptive coating is a high-temperature solar selective coating (e.g., a coating capable of functioning at temperatures of more than 700° C.).

In some embodiments, the solar absorptive coating includes a plurality of microstructures and/or a plurality of nanostructures. Exemplary microstructures and nanostructures include trenches (e.g., having a width of from about 5 µm to about 30 µm (e.g., from 5 µm to about 20 µm, such as about 10 µm) and/or a spacing between two trenches of from about 20 µm to about 70 µm (e.g., 20 µm to 50 µm, such as about 30 µm)); one or more redeposition layer (e.g., disposed on one or more trenches, having any useful thickness, such as about 0.5 µm to 2 µm); columnar structures (e.g., having a spacing between two columns of from about 50 nm to about 750 nm (e.g., from 100 nm to 500 nm, such as about 250 nm)); a surface roughness greater than 3 µm (e.g., from 3 µm to about 5 µm); and/or fine substructures (e.g., having a dimension that is less than 10 nm, such as of from about 1 nm to about 8 nm, disposed on any useful surface, such as on a columnar structure). In particular embodiments, the coating includes both microstructures and nanostructures, thereby providing a surface encompassing multi-length scales in order to effectively interact within incoming photons (e.g., and resulting in effective solar absorption, such as, e.g., that determined by a solar absorptance greater than about 0.9).

In some embodiments, the pulsed laser source has a pulse width from about 100 fs to about 1000 ns (e.g., from about 1 ns to 500 ns, 1 ns to 400 ns, 1 ns to 300 ns, 50 ns to 500 ns, 50 ns to 400 ns, 50 ns to 300 ns, 100 ns to 500 ns, 100 ns to 400 ns, or 100 ns to 300 ns).

In other embodiments, the pulsed laser source has a wavelength from about 700 nm to about 1200 nm (e.g., about 750 nm, 800 nm, 850 nm, 900 nm, or 1000 nm).

In yet other embodiments, the pulsed laser source has a pulse energy more than about 1 mJ (e.g., from about 1 mJ to about 100 mJ).

In some embodiments, the pulsed laser source has an average power of more than about 2 watts (e.g., from about 2 watts to about 1000 watts). In another instance, the applied power is about 1 mW to about 20 mW).

In some embodiments, the pulsed laser source has a repetition rate of between about 1 kHz to about 500 kHz (e.g., from about 1 kHz to 100 kHz, 1 kHz to 200 kHz, 1 kHz to 300 kHz, 1 kHz to 400 kHz, 10 kHz to 100 kHz, 10 kHz to 200 kHz, 10 kHz to 300 kHz, 10 kHz to 400 kHz, 10 kHz to 500 kHz, 15 kHz to 100 kHz, 15 kHz to 200 kHz, 15 kHz to 300 kHz, 15 kHz to 400 kHz, 15 kHz to 500 kHz, 20 kHz to 100 kHz, 20 kHz to 200 kHz, 20 kHz to 300 kHz, 20 kHz to 400 kHz, or 20 kHz to 500 kHz).

In particular embodiments, the pulsed energy source is a nanosecond laser. For instance, the nanosecond laser can have a pulse duration of between about 1 ns to about 400 ns, a wavelength of about 1064 nm, an average power of more than about 2 watts (e.g., more than about 20 watts), a repetition rate of about 15 kHz to about 300 kHz, and/or a beam diameter of from about 10 μm to about 100 μm.

In other embodiments, the pulsed energy source is a femtosecond laser. For instance, the femtosecond laser can have a pulse energy of more than about 1 mJ, a repetition rate of between about 1 kHz to about 100 kHz, an applied power of from about 5 mW to about 10 mW, and/or a wavelength of about 800 nm.

In some embodiments, the surface is a substrate for absorption of solar energy (e.g., a CSP receiver, a solar tower, a trough, a Stirling engine, a heat absorber, a solar collector, or any useful substrate, such as any described herein, or a portion thereof).

In another aspect, the invention features a solar absorptive coating formed by any method described herein.

DEFINITIONS

As used herein, the term "about" means+/−10% of any recited value. As used herein, this term modifies any recited value, range of values, or endpoints of one or more ranges.

The term "ceramic material" usually refers to an inorganic, essentially non-metallic protective coating, on a substrate (e.g., a metal substrate) suitable for use at or above about 500° C. However, the term ceramics both with regard to a ceramic filler, and the ceramic coating of this invention, includes all engineering materials or products that are chemically inorganic (e.g., except metals and metal alloys), and also includes composites, such as ceramic-metal combinations and other combinations of ceramic materials involving organic filler materials.

By "micro" is meant having at least one dimension that is less than 1 mm. For instance, a microstructure (e.g., any structure described herein) can have a length, width, height, cross-sectional dimension, circumference, radius (e.g., external or internal radius), or diameter that is less than 1 mm.

By "nano" is meant having at least one dimension that is less than 1 μm. For instance, a nanostructure (e.g., any structure described herein) can have a length, width, height, cross-sectional dimension, circumference, radius (e.g., external or internal radius), or diameter that is less than 1 μm.

As used herein, the terms "top," "bottom," "upper," "lower," "above," and "below" are used to provide a relative relationship between structures. The use of these terms does not indicate or require that a particular structure must be located at a particular location in the apparatus.

Other features and advantages of the invention will be apparent from the following description and the claims.

DETAILED DESCRIPTION OF THE INVENTION

Figure 1A:
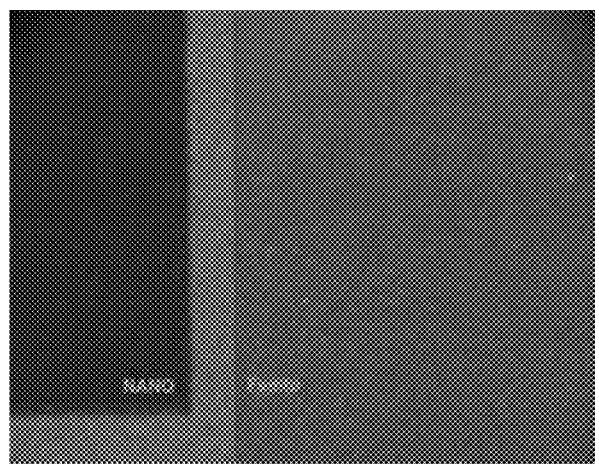
FIG. 1A-1B shows a $Cr_2O_3$ surface treated with a nanosecond laser, as compared to a femtosecond laser. A: The photograph shows a $Cr_2O_3$ sample treated with both the femtosecond laser (right) and the nanosecond laser (left). The region treated with the nanosecond laser appeared significantly darker than the region treated with the femtosecond laser. Nanosecond laser treatment was at least 50× faster than femtosecond laser treatment because the nanosecond laser can be translated optically. B: The graph shows optical measurements of reflectivity (% R) versus wavelength of the as-sprayed $Cr_2O_3$ sample (labeled "$Cr_2O_3$"), the femtosecond laser-treated sample (labeled "Femto"), and the nanosecond laser-treated sample (labeled "Nano"). As can be seen, nanosecond laser treatment produced the largest reduction in reflectance at all wavelengths.

The present invention relates to solar absorptive coatings, as well methods of making and using such coatings. Such coatings, methods, and uses are described herein.

Solar Absorptive Coating

Generally, the solar absorptive coatings of the invention include a ceramic material (e.g., any described herein). Upon treatment with a pulsed laser source, the ceramic material undergoes substantial darkening and displays increased solar absorptivity, as compared to a surface without laser treatment. Without wishing to be limited by mechanism, this resultant increase in solar absorptivity likely arises from the creation of nanostructures on the treated surface. Such nanostructures have dimensions smaller than the wavelength of light in the solar spectrum (e.g., about 250-2500 nm) and likely promote photon scattering at the surface.

The coatings of the invention can be directed applied to a substrate of interest. Alternatively, the coating can be integrated as a component of a multilayered coating. Exemplary layers in a multilayer coating include a thermal expansion management layer, a protective layer (e.g., an $Al_2O_3$ layer), an absorber layer, a roughening template layer, a reflector layer, a high metal volume fraction (HMVF) layer, a low metal volume fraction (LMVF) layer, a dielectric layer, an anti-reflective layer, etc. In particular embodiments, the solar absorptive coating of the invention is included in the absorber layer of a multilayered coating or any layer described herein. In another example, the multilayered coating can include one or more of the following layers configured to provide a gradual variation in refractive index, thereby providing efficient absorption by phase interference: a reflector layer (e.g., an infrared reflective mirror layer, such as a Cu or Mo layer), an HMVF layer (e.g., a HMVF ceramic-metal composition or cermet layer), a LMVF layer (e.g., a LMVF cermet layer), and/or an anti-reflective layer (e.g., an $SiO_2$ layer). In some embodiments, the HMVF layer, LMVF layer, and/or anti-reflective layer include the solar absorptive coating of the invention.

Methods of testing such coatings are described in Kennedy C E et al., Progress in development of high-temperature solar-selective coating, *Proc. ISEC*2005, 2005 International Solar Energy Conference Aug. 6-12, 2005, Orlando, Fla. USA, 7 pages; Kussmaul M et al., "Ion beam treatment of potential space materials at the NASA Lewis Research Center," *Surf Coatings Technol.* 1992 April; 51(1-3):299-306; Tsukamoto M et al., "Periodic microstructures produced by femtosecond laser irradiation on titanium plate," *Vacuum* 2006; 80:1346-50; and Nejati M, "Cermet based solar selective absorbers; further selectivity improvement and developing new fabrication technique," Dr.-Ing. Dissertation for the Universitat des Saarlandes, 2008, 190 pages, each of which is incorporated herein by reference in its entirety.

Methods of Making Solar Absorptive Coating

The present invention includes methods of making solar absorptive coatings, as well as applying such coatings to structures or substrates and integrating such coatings as components of a multilayered coating.

In general, the coatings of the invention are made by applying a ceramic material (e.g. any described herein, such as a ceramic oxide) to a surface, optionally curing the applied ceramic material to form a coated surface, and then treating the coated surface with a laser source.

The ceramic material can be applied by any useful method, such as thermal spraying (e.g., air plasma spraying), dip coating, spin coating, roll coating, spray coating, physical vapor deposition, chemical vapor deposition, electrodeposition, electroless deposition, anodization, chemical conversion, sol-gel deposition, spray pyrolysis, sputtering (e.g., radiofrequency planar sputtering, direct current sputtering, triode sputtering, reactive sputtering, glow discharge sputtering, and magnetron sputtering), evaporation (e.g., cathodic arc evaporation), ion plating, annealing, photolithography, e-beam lithography, holography, embossing, and laser patterning. Optionally, the ceramic material can be cured, hardened, or annealed.

The coated surface having the ceramic material is then treated with a laser source. In some embodiments, the laser source is a pulsed laser source. In particular, for some surfaces, we have observed that a nanosecond laser provided enhanced reduction in reflectance, as compared to a femtosecond laser. In addition, nanosecond laser treatment provides other benefits, such as increased translation speed of the laser beam, reduced treatment time, and lower cost, as compared to the femtosecond laser treatment. The laser source can have any useful characteristics, such as optimized laser wavelength (e.g., 1064 nm, 800 nm, etc.), laser pulse frequency (e.g., 1 kHz, 50 kHz, etc.), laser pulse width (e.g., 100 fs, 200 ns, etc.), pulse repetition rate, power, power density, fluence, scan rate, scan pattern, beam spot size, etc. Exemplary laser sources include a pulsed fiber nanosecond laser, an infrared laser, a Ti:sapphire laser, etc. The laser source can be used with any other component(s) to facilitate treatment, such as an energy attenuator, a shutter, a filter, a lens, a mirror, a scanning head, etc.

For general use, laser treatment can occur in ambient air conditions. Optionally, laser treatment can be conducted in laboratory conditions, such as with controlled pressure under vacuum.

Multicomponent coatings can also be made, such as those forming multilayered coatings, graded coatings, or blended coatings. Methods for making such multicomponent coatings include blending one or more materials into a single feedstock or an agglomerated powder, pre-alloying materials to form a single block, fusing multiple layers, as well as other deposition methods described herein, such as spray drying.

Additional methods of making and testing coatings are described in Selvakumar N et al., "Review of physical vapor deposited (PVD) spectrally selective coatings for mid- and high-temperature solar thermal applications," *Solar Energy Mater Solar Cells* 2012 November; 98:1-23; and Zhang Q C, "Recent progress in high-temperature solar selective coatings," *Solar Energy Mater Solar Cells* 2000; 62:63-74, each of which is incorporated herein by reference in its entirety.

Materials

The solar absorptive coating can include any useful material (e.g., ceramic materials) that displays increased solar absorptivity upon treatment with a pulsed laser source.

The material can be a ceramic material, such as a ceramic oxide, a dielectric, or a cermet. In some embodiments, the material is a ceramic oxide. Exemplary ceramic oxides include chromium oxide, such as $Cr_2O_3$, $Cr_2O_3$-$xTiO_2$ (e.g., where x is 2-40 nominal wt. % (nom. wt. %), such as x is 40 nom. wt. %), $Cr_2O_3$-$xSiO_2$-$yTiO_2$ (e.g., where x is 4-5 nom. wt. % and y is 3 nom. wt. %); lanthanum-based perovskites, such as lanthanum strontium manganite (e.g., $LaSrMnO_3$, such as $(La_{0.8}Sr_{0.2})_xMnO_3$, where x is 0.8 to 1 (e.g., x is 0.98), or $La_ySr_zMnO_3$, where y+z=1), lanthanum strontium chromite (e.g., $La_xSr_yCrO_3$, such as $La_{0.84}Sr_{0.16}CrO_3$ or where x+y=1), lanthanum calcium manganite (e.g., $La_x$-$Ca_yMnO_3$, such as $La_{0.8}Ca_{0.2}MnO_3$ or where x+y=1), lanthanum strontium ferrite (e.g., $La_xSr_yFeO_3$, such as $La_{0.6}Sr_{0.4}FeO_3$ or where x+y=1), lanthanum strontium cobaltite ferrite (e.g., $LaSrCoFeO_3$, such as $La_{0.6}Sr_{0.4}Co_{0.2}Fe_{0.8}O_3$ or $La_{0.78}Sr_{0.2}Co_{0.2}Fe_{0.8}O_3$, where subscripts refer to mol. %), and lanthanum strontium gallate magnesite (e.g., $La_{0.8}Sr_{0.2}Ga_{0.8}Mg_{0.2}O_3$); manganese cobalt oxide, such as $Mn_{1.5}Co_{1.5}O_4$; silicon oxide, such as SiO; cerium oxide, such as $CeO_2$; zinc oxide, such as ZnO; aluminum oxide, e.g., $Al_2O_3$, $Al_2O_3$-$xTiO_2$ (e.g., where x is 2-50 nom. wt. %, such as x is 3, 13, or 40 nom. wt. %), $Al_2O_3$-$xTiO_2$-$ySiO_2$-$zZrO_2$ (e.g., where x is 32, y is 8.5, and z is 3), $Al_2O_3$-$xSiO_2$ (e.g., where x is 8-25), $Al_2O_3$-$xMgO$ (e.g., where x is 24), and $Al_2O_3$-$xZrO_2$ (e.g., where x is 23); magnesium oxide, such as MgO; titanium oxide, such as $TiO_x$ (e.g., where x is 1.7, 1.8, 1.9, or 2), $BaTiO_2$, or $TiO_2$-$xCr_2O_3$ (e.g., where x is 45 nom. wt. %); strontium oxide, such as SrO; zirconium oxide, such as $ZrO_2$ or stabilized $ZrO_2$ including $ZrO_2$-$xY_2O_3$ (e.g., where x is 7-25 nom. wt. %), $ZrO_2$-$xY_2O_3$-$yHfO_2$ (e.g., where x is 7.5 and y is 1.8), $ZrO_2$-$xCeO_2$ (e.g., where x is 25 nom. wt. %), $ZrO_2$-$xCeO_2$-$yHfO_2$ (e.g., where x is 21 nom. wt. % and y is 1.5 nom. wt. %), $ZrO_2$-$xCeO_2$-$yY_2O_3$ (e.g., where x is 25 nom. wt. % and y is 2.5 nom. wt. %), $ZrO_2$-$xTiO_2$-$yY_2O_3$ (e.g., where x is 18 nom. wt. % and y is 10 nom. wt. %), $ZrO_2$-$xCaO$ (e.g., where x is 5-24 nom. wt. %), $ZrO_2$-$9.5Y_2O_3$-$5.6Yb_2O_3$-$5.2Gd_2O_3$, and $ZrO_2$-$xMgO$ (e.g., where x is 5-24 nom. wt. %); hafnium oxide, such as $HfO_2$; vanadium oxide, such as $VO_2$; nickel oxide, such as NiO; and indium oxide, such as $In_2O_3$ or $In_2O_3$-$10SnO_2$.

Such ceramic oxides can optionally include one or more dopants (e.g., Sr) and/or can optionally be alloyed (e.g., with $SiO_2$ and/or $TiO_2$ to improved toughness and mechanical shock resistance). Commercially available ceramic oxides and mixed forms thereof include those available from Sulzer Metco Inc., Westbury, N.Y. (under the trade names Metco™), Saint-Gobain Ceramics and Plastics, Inc., Worcester, Mass., and Bay State Surface Technologies, Auburn, Mass.

In particular embodiments, the ceramic material has a perovskite structure, such as $ABO_3$, where A is Ca, La, Sr, or Ba; B is Co, Cr, Mn, Fe, Ti, or Al; and optionally including one or more dopants (e.g., Sr, Mg, Ca, Ba, Ni, Ru, silicate, Ag, or Ga). Another exemplary perovskite structure includes $A_xA'_{1-x}BO_3$, wherein each A and A' is differently and independently selected from the group of Ca, La, Sr, Mg, and Ba; and B is Co, Cr, Mn, Fe, Ti, or Al. Exemplary perovskite materials include $LaMnO_3$, $LaSrMnO_3$, $LaBaMnO_3$, $LaCaMnO_3$, $LaMgMnO_3$, $SrMnO_3$, $LaCoO_3$, $LaSrCoO_3$, $LaBaCoO_3$, $LaCaCoO_3$, $LaMgCoO_3$, and $SrCoO_3$.

In some embodiments, the material is a dielectric, such as $Al_2O_3$, $SiO_2$, $CeO_2$, AN, $ZrO_2$, ZnS, as well as any ceramic or cermet material described herein.

In other embodiments, the material is a composite material including metal particles in a matrix of a ceramic material (i.e., a cermet). Exemplary cermets include an alumina-based cermet having $Al_2O_3$ as the ceramic material, such as Ni—$Al_2O_3$ (e.g., $Al_2O_3$-30(Ni20Al), which is a 29-31 wt. % Ni20Al chemically clad nickel-aluminum (Ni 20% Al) powder in a fused and crushed aluminum oxide ceramic material, available as Metco™ 41 ONS from Sulzer Metco Inc.), Co—$Al_2CO_3$, Cr—$Al_2CO_3$, V—$Al_2CO_3$, Ag—$Al_2O_3$, Mo—$Al_2O_3$, Cu—$Al_2O_3$, W—$Al_2O_3$, Pt—$Al_2O_3$, and Au—$Al_2O_3$; a magnesium zirconate-based cermet, such a $MgZrO_3$-35NiCr or $MgZrO_3$-26Ni7Cr2Al, which is a 34-36 nom. wt. % nickel-chromium or nickel-chromium-aluminum powder in a magnesium zirconate ceramic material, available as Metco™ 303NS-1 and Metco™ 441NS-1 from Sulzer Metco, Inc.; Au—MgO; Cr—$Cr_2O_3$ (also known as black chrome); Mo—$Cr_2O_3$; Ni—ZnS (also known as black nickel); Ni—$NiO_x$; Ni—$MgF_2$; Co—$Co_3O_4$ (also known as black cobalt); Mo—$MoO_2$ (also known as black moly); W—$WO_x$ (also known as black tungsten); $TiN_xO_y$; Mo—AlN; W—AlN; or graded composites thereof.

The material can also include one or more intrinsic absorbers, which are materials that intrinsically display solar selective properties. Exemplary intrinsic absorbers include metals (e.g., metallic W or doped metals, such as $MoO_3$-doped Mo), silicon (e.g., Si doped with B), fluorides (e.g., $CaF_2$), carbides (e.g., HfC), borides (e.g., $ZrB_2$ or $LaB_6$), or oxides (e.g., $SnO_2$, $In_2O_3$, $Eu_2O_3$, $ReO_3$, and $V_2O_5$).

In yet other embodiments, the material is a carbide, such as titanium carbide (e.g., TiC), silicon carbide (e.g., SiC), boron carbide (e.g., $B_4C$), chromium carbide (e.g., $Cr_3C_2$, $Cr_3C_2$-x(Ni-20Cr) (e.g., where x is 7-50), and $Cr_3C_2$-x (NiCrAlY) (e.g., where x is 25)), vanadium carbide (e.g., VC), tungsten carbide (e.g., WC, $W_2C$, WC-xCo-yCr (e.g., where x is 10-20 and y is 0-4), $W_2C$/WC-xCo (e.g., where x is 12), (WC-12Co)-25(Ni base super alloy), and (WC-12Co)-35($Cr_3C_2$)-20(Ni-20Cr)), hafnium carbide (e.g., HfC), or tantalum carbide (e.g., TaC); a nitride, such as titanium nitride (e.g., TiN); a silicide, such as molybdenum silicide (e.g., $MoSi_2$); a boride, such as hafnium boride (e.g., $HfB_2$) or zirconium boride (e.g., $ZrB_2$); a refractory metal (e.g., W, Ta, Mo, or Nb); a metal spinel oxide (e.g., $AB_2O_4$, where A, B=Ni, Co, Fe, or Cu) as well as mixtures thereof.

The ceramic materials can be included in any useful base, such as a resin (e.g., polyethylene, polyester, or polypropylene), to form a paint. The physical characteristics of the ceramic material can be optimized for application to the surface. Such characteristics include particle size, degree of dispersion, volume fraction, scattering properties, wetting properties, etc. Exemplary paints and ceramic materials are described in Wijewardane S et al., "A review on surface control of thermal radiation by paints and coatings for new energy applications," *Renewable Sustainable Energy Rev.* 2012; 16:1863-73, which is incorporated herein by reference in its entirety.

One or more of the following can be included to improve material processing or material properties, such as one or more additives, such as a detergent, e.g., Triton® X, such as to improve wetting; binders, e.g., polyvinyl alcohol; pigments, such as manganese ferrite black spinel (e.g., FeMnO$_x$); resins; and stabilizers, e.g., TiO$_2$.

Further materials are provided in Ambrosini A et al., "Improved high temperature solar absorbers for use in concentrating solar power central receiver applications," *Sandia Report SAND*2010-7080 (October 2010), 43 pages; and Kennedy C E, "Review of mid- to high-temperature solar selective absorber materials," *National Renewable Energy Laboratory Technical Report NREL/TP*-520-31267 (July 2002), 58 pages, each of which is incorporated herein by reference in its entirety.

Uses

The present invention also includes use of the solar absorptive coating on one or more substrates and structures that would benefit from increased solar absorptivity. Such structures include those useful for solar collectors, such as solar absorption coatings on flat plate collectors, evacuated tube collectors, concentrating collectors, solar towers, receivers, Concentrating solar power (CSP) systems employ solar absorbers to convert collected sunlight into electric power. In general, a CSP employs mirrors to focus sunlight onto a receiver, which is configured to capture the collected light and convert this light into heat. For example, in a power tower system, mirrors (heliostats) are arranged to focus light onto a receiver that is mounted atop of a tall power tower. In the receiver, the heat is absorbed by a fluid or a molten material (e.g., molten salts, such as nitrate salts) and then used to boil water into steam, which in turn is conveyed to a steam turbine generator to produce electricity. In another example, a dish system includes a parabolic dish that concentrates sunlight to a receiver, which is mounted at the focal point of the dish. In this integrated assembly, the receiver includes a combustion engine having gas tubes that can be heated by the concentrated sunlight, which results in gas expansion to drive the piston, crankshaft, and electric generator connected to the engine. In yet another example, a trough system employs a parabolic U-shaped reflector having a receiver mounted along the focal point of the reflector. The receiver (e.g., a hear collection element) is generally a tube coated with a solar absorptive coating. Within the tube, a fluid (e.g., an oil) absorbs heat, which in turn is used to boil water, form steam, and drive a steam turbine generator. In any of these systems, the receiver or any other surface can include one or more solar absorptive coatings of the invention to promote light adsorption.

In CSP systems, efficiency can be increased by improving the efficiency of solar collectors, increasing operating temperatures, and/or increasing power cycle efficiency. In one embodiment, efficiency can be increased by including one or more solar absorptive coatings on a solar receiver or the heat-collection element of CSPs, thereby increasing the current operation limit to 400° C. In particular embodiments, the coating is thermally stable above about 500° C. in air. In some embodiments, the coating has high spectral selectivity, such as high absorptance in the solar spectrum (e.g., $\lambda<2.5$ μm) and low thermal emittance in the thermal infrared spectrum (e.g., $\lambda>2.5$ μm). In other embodiments, the coating has a low reflectance p at wavelength $\lambda \leq 2$ μm (e.g., $\rho \sim 0$), a high reflectance $\rho$ at $\lambda \geq 2$ μm (e.g., $\rho \sim 1$), a high solar absorptance a at wavelength $\lambda \leq 2$ μm (e.g., $\alpha \geq 0.96$), and/or a low thermal emittance $\in$ (e.g., $\in \leq 0.07$ at 400° C. in the infrared region, $\lambda \geq 2$ μm).

The solar absorptive coatings of the invention can be renewed after its first application. For instance, CSP systems generally have a long lifetime (e.g., over 30 years). In addition, these systems encounter daily thermal cycling. Over the years, various factors can contribute to degradation of the solar absorptive coating, such as high thermal load, high water condensation, and environmental exposure to sun, heat, debris, and wind. Thus, renewable surfaces would be beneficial. The present invention also allows for renewing a coating by treating the surface with a laser after the first application of the coating. Accordingly, the present invention also includes methods of renewing a coated surface by treating the surface with a laser source. The coated surface can include any coating, such as Pyromark® 2500, a high-temperature silicone-based paint including manganese ferrite black spinel as the black pigment (available from LA-CO Indus., Inc., Elk Grove Village, Ill.) or any coating described herein (e.g., the solar absorptive coating of the invention).

Substrate

The solar absorptive coating of the invention can be applied to any useful surface of a substrate. Exemplary substrates include a surface for absorption of solar energy, such as surfaces on CSP receivers, solar towers, troughs, Stirling engines, heat absorbers, and solar collectors; a metal substrate, such as stainless steel, carbon steel, austenitic superalloys, Ni—Cr-based superalloys (e.g., Inconel®600, 601, and 690, from Special Metals Corp., New Hartford, N.Y.; Ni—Cr—Al-based alloys, such as Inconel® 693; Ni—Cr—W-based alloys, including Co—Ni—Cr—W alloys and Ni—Cr—W—Mo alloys, such as Haynes®25, 188, and 230 from Haynes Int'l, Inc., Kokomo, Ind.; Fe—Ni—Co—Cr-based alloys, such as Haynes®556; Ni—Cr—Mo—Nb-based alloys, such as Inconel® 725 and Haynes®625; Fe—Ni—Cr-based alloys, such as Inconel®706 and Haynes®HR-120®; Ni—Cr—Mo-based alloys, such as Inconel® 625, 625LFC® and Ni—Cr—Co—Mo-based Inconel®617, as well as Hastelloy®S from Haynes Intl, Inc.; Ni—Co—Cr—Si-based alloys, such as Haynes®HR-160®; and Ni—Fe—Cr—Mo-based alloys, such as Hastelloy®X); and a substrate undergoing thermal cycles having an upper range of 300-800° C. or higher.

The solar absorptive coating can be applied directly or indirectly onto the substrate. For direct application, the coating is in contact with the surface of the substrate. For indirect application, the coating can be a component of a multilayered coating stack, such that the solar absorptive coating of the invention is embedded within the multilayered stack or located on the top surface of the multilayered stack. In addition, one or more interleaving layers or structures can be present between the solar absorptive coating and the surface of the substrate. Exemplary interleaving layers include a roughening template layer, a reflector layer, an anti-reflective layer, etc.

EXAMPLES

Example 1

Solar Absorptive Coatings with Femtosecond and Nanosecond Laser Treatment

The present invention relates to solar absorptive coatings formed by laser treatment. Here, we compare treatment with a femtosecond laser and a nanosecond laser. Results of these experiments are provided in FIG. 1A-1B.

Figure 1B:
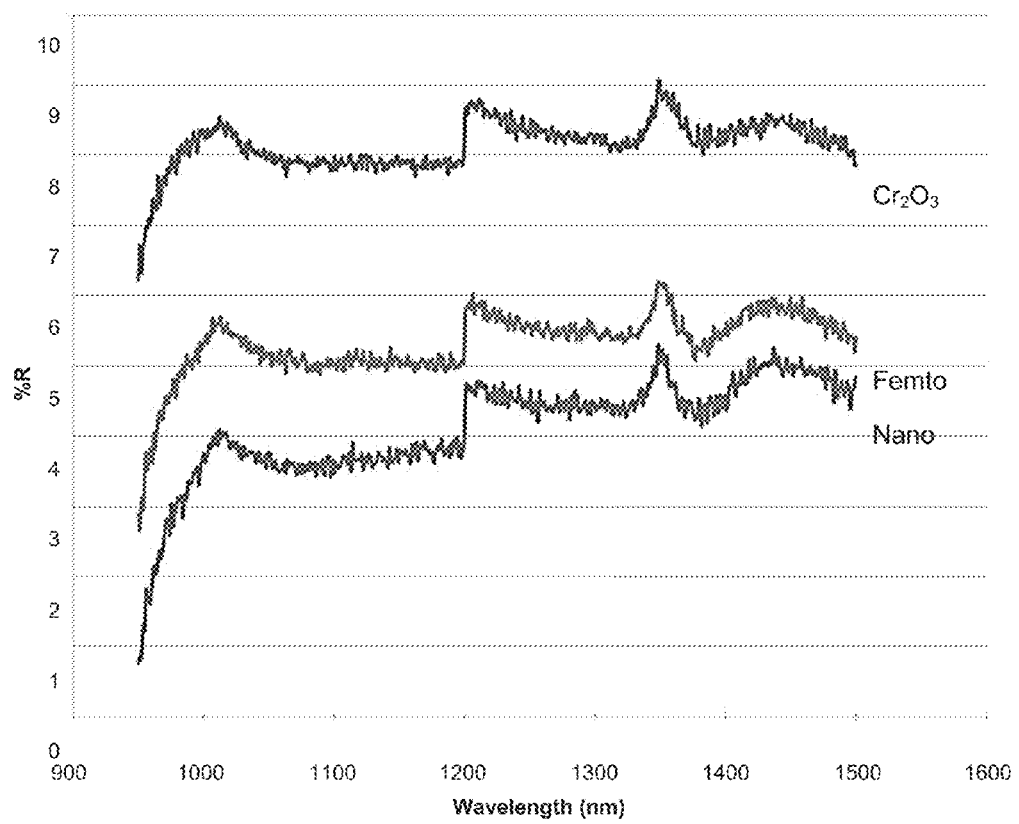

The femtosecond laser treated sample shown in FIG. 1A-1B was treated using an 800 nm Spectra-Physics® laser capable of 100 Femtosecond pulsed output at 1 khz pulse frequency. The laser was operated at the following conditions: 16 mW laser power, 1 kHz pulse rate, 1 mm/s traverse rate, 5× objective lens, and a 0.010 mm×0.010 mm raster pattern. The laser-treatment was conducted in an evacuated chamber at pressures ranging from 500 mTorr-6 Torr.

In an effort to reduce the time required for laser treatment, a nanosecond laser equipped with an optical scanning head was used. The femtosecond laser used herein had a fixed beam path and was not equipped with an optical scanning head. Laser beam translation was accomplished by moving the sample using a high-precision mechanical stage. Thus, the maximum laser traverse speed was limited by the maximum speed of mechanical stage (~1 mm/s). In contrast, the nanosecond laser included a scanning head, which allowed the laser's focal point to be moved optically while the substrate remains fixed. This greatly increased the translation speed of the laser beam (e.g., data are shown for a nanosecond laser having a translation speed of 50 mm/s), thus reducing the time required for laser treatment.

For nanosecond laser treatment, an SPI G3 pulsed fiber nanosecond laser with a beam expander set at 8× attached to Nutfield XLR8 scan head was used to laser treat a $Cr_2O_3$ sample. A LINOS f163 lens was used to focus the beam on sample. The laser treatment parameters used were laser power of 5 W (commanded), beam translation speed of 50 mm/s, laser pulse frequency of 50 kHz, laser pulse width of 200 ns, a serpentine raster, raster step size of 40 μm, and an incident beam spot size of 50 μm. Faster translation speeds are possible when employing an optical scanning head.

Treatment with the femtosecond or nanosecond laser was successful in darkening the $Cr_2O_3$ sample. Furthermore, the $Cr_2O_3$ region treated with the nanosecond laser appeared to be darker than the $Cr_2O_3$ region treated with the femtosecond laser (FIG. 1A). Reflectance measurements confirm this observation (FIG. 1B). Under these conditions, nanosecond laser treatment was faster than femtosecond laser treatment and provided better results. It is important to note that darkening mechanism associated with nanosecond laser treatment may be different than the darkening mechanism associated with femtosecond laser treatment.

Nanosecond laser treatment has other benefits, such as reduced cost. Regardless of traverse speed, nanosecond laser treatment will be less costly than femtosecond laser treatment because nanosecond lasers are significantly less expensive than femtosecond lasers. The SPI G3 nanosecond laser used above costs about ten times less than the femtosecond laser. Lower cost equipment that accomplishes laser treatment significantly faster will undoubtedly result in lower laser treatment cost.

Example 2

Nanostructured Ceramic Surfaces for Application to Central Power Tower Receivers Analysis of plasma sprayed $Cr_2O_3$ and LSM coatings modified using laser surface treatment are discussed. Both laser-treated coatings exhibited solar absorptivity figures of merit similar to Pyromark®-2500, the industry standard SPT receiver coating. Identifying the mechanism for the high figure of merit is critical to successfully evaluating the coating's long term high temperature performance.

Thermal spray coating processes prepare thick (>25 microns) metal and ceramic coatings via droplet deposition. A feed stock material, typically powder, is melted and propelled toward the substrate. When the feed stock droplets impact, they deform, solidify, and build a coating. Unlike other coating technologies, thermal spray processes allow rapid coating of large substrates without a vacuum chamber.

Just as many different welding process exist (e.g. laser welding, electron beam welding, and shielded metal arc welding), many different thermal spray processes exist. All coatings discussed in this example were prepared using the Air Plasma Spray (APS) process. The APS process melts and propels feed stock using an inert gas plasma. When the feed stock droplets impact the substrate they deform, solidify, and consolidate to form a lamellar coating. Air plasma spray torches can effectively work high melting point materials because the plasma is an extremely high temperature heat source, ~10,000° C. Air plasma spray torches are relatively portable and can coat large substrates in the field.

Chrome oxide is a common plasma spray coating. Chrome oxide melts at 2435° C. (4415° F.). Also, it is extremely stable thermally, extremely hard, and insoluble in water, acids, and alkalis. Plasma sprayed $Cr_2O_3$ is dark green to black in color. It finds application as a high temperature, wear resistant surface for pumps and impeller housing. Chrome oxide coatings are also commonly used as the laser engravable surface for Anilox printing rolls (Sulzer-Metco Technical Bulletin #10-658, "AMDRY® 6420 Chromium Oxide Powder For Wear Resistant Coatings," October 2000). Plasma sprayed chrome oxide coatings are used at service temperatures of 815° C. (1500° F.) or higher.

Lanthanum Strontium Manganite (LSM) is a single-phase perovskite ceramic material. It is also commonly plasma sprayed and finds application as an electrolyte for Yittria-Stabilized Zirconia (YSZ) based solid oxide fuel cells (Sulzer-Metco Material Product Data Sheet for Lanthanum Strontium Manganite (LSM) Powder, #DSMTS-0024.2, 2012). In this application, LSM coatings are routinely used at service temperatures up to 800° C. (1475° F.). Lanthanum Strontium Manganite is actually a family of perovskite materials with various specific compositions. Most LSM's exhibit melting points in excess of 1000° C. (Jiang S P, "Development of lanthanum strontium manganite perovskite cathode materials of solid oxide fuel cells: a review," J. Mater. Sci. 2008 November; 43(21):6799-833). The LSM investigated here was $(La_{0.8} Sr_{0.2})_{0.98} MnO_3$.

Experimental Procedures

Coating preparation: All coatings were prepared using a TriplexPro®-210 air plasma spray torch (Sulzer-Metco, Inc. Westbury, N.Y.). The torch was mounted on an ABB IRB-6600 six axis robot which controlled the spray path. Commercially available feed stock powders optimized for thermal spray were used. Table 1, below, identifies the feed stock powder and provides the exact torch operating conditions used to prepare both the $Cr_2O_3$ and Lanthanum Strontium Manganite (LSM) coatings.

TABLE 1

Process parameters and set points used to prepare $Cr_2O_3$ and LSM coatings

| Process Parameter | $Cr_2O_3$ Set Point | LSM Set Point |
|---|---|---|
| Spray Torch | TriplexPro ®-210 | TriplexPro ®-210 |
| Current | 470 A | 400 A |
| Argon | 47.5 SLPM | 46 SLPM |
| Helium | 35 SLPM | 0 SLPM |
| Nozzle | 9 mm | 9 mm |
| Powder Injector | 1.8 mm | 1.8 mm |
| Injector Holder | 90°-Long | 90°-Long |
| Powder Hopper | Sulzer-Metco 9MP-CL | Sulzer-Metco 9MP-CL |
| Powder Gas Flow (Argon) | 3.5 SLPM | 5.0 SLPM |

TABLE 1-continued

Process parameters and set points used to prepare $Cr_2O_3$ and LSM coatings

| Process Parameter | $Cr_2O_3$ Set Point | LSM Set Point |
| --- | --- | --- |
| Powder Hopper pressure | 200 mbar | 200 mbar |
| Pneumatic Vibration pressure | 2000 mbar | 2000 mbar |
| Powder Feed Rate | 30 g/min | 30 g/min |
| Air Jet Cooling pressure | 4 Bar | 4 Bar |
| Spray Pattern | Raster | Raster |
| Stand Off Distance | 6 in | 6 in |
| Number of passes | 3 passes | 10 passes |
| Traverse speed | 999 mm/s | 800 mm/s |
| Step speed | 500 mm/s | 500 mm/s |
| Step size | 5 mm | 5 mm |
| Powder | PP-39 (Bay State Surface Technologies, Inc., Auburn, MA) | Metco ™-6800 |
| Nominal Composition | 99% $Cr_2O_3$ | $(La_{0.8}Sr_{0.2})_{0.98} MnO_3$ |

The $Cr_2O_3$ feed stock powder had a fused and crushed morphology, and is not expected to break during feeding. Energy dispersive spectroscopy (EDS) analysis confirmed the presence of Ti, Si, and Zr impurities.

Laser surface treatment: After spraying, both coatings were treated with a Femtosecond laser with the intention of increasing their roughness. Other surfaces have shown increased absorptivity when roughened (Brown R J C et al., "The physical and chemical properties of electroless nickel-phosphorus alloys and low reflectance nickel-phosphorus black surfaces," *J. Mater. Chem.* 2002; 12:2749-54). Laser-treatment was conducted using an 800 nm Spectra-Physics® laser capable of 100 femtosecond pulsed output at 1 kHz pulse frequency. Three laser-treatment conditions were used as indicated in Table 2, below. Laser-treatment was conducted in an evacuated chamber at pressures ranging from 500 mTorr-6 Torr, although laser-treatment can be conducted in air. A vacuum chamber was used because it protects personnel from any material that could evolve from the coating surface during laser-treatment.

TABLE 2

Process parameters and set points used for $Cr_2O_3$ and LSM laser-treatment

| Process Parameter | Set Point 1 | Set Point 2 | Set Point 3 |
| --- | --- | --- | --- |
| Laser Power | 8 mW | 16 mW | 16 mW |
| Pulse Rate | 1 kHz | 1 kHz | 1 kHz |
| Traverse rate | 1 mm/s | 1 mm/s | 1 mm/s |
| Raster pattern size | 0.010 mm × 0.010 mm | 0.010 mm × 0.010 mm | 0.010 mm × 0.010 mm |
| Objective lens | 20× | 20× | 5× |

X-ray diffraction analysis: Micro-X-ray-Diffraction (μ-XRD) was employed because of the small sample size. In this way, a spatially specific analysis could be performed. μ-XRD data were collected using a Bruker D8 diffractometer with GADDS (Hi-Star area detector) and a eulerian texture cradle equipped with an XYZ translation stage (Bruker-AXS, Inc., Madison, Wis.). The D8 system employed a sealed-tube (Cu $K_\alpha$) X-ray source with an incident beam mirror optic (for removal of $K_\beta$ radiation). A 500 μm pinhole snout was used as an incident-beam optic to generate a small, collimated beam suitable for μ-XRD analysis. Area detector frames were collected at two positions of 2θ, selected such that the 1D 2θ scans, obtained by integration of a portion of the area detector frame, would overlap. The count time for each frame was 300 seconds. 1D scans were integrated within the GADDS software and merged and analyzed within the program JADE, ver.9.4.1 (Materials Data Inc., Livermore, Calif.).

Surface roughness analysis: All surface roughness data were collected using a Model Wyko NT1100 Scanning White Light Interferometer manufactured by Veeco Instruments Inc., Plainview, N.Y. The instrument was operated in vertical scanning mode (100 micron scan) at 50.3× effective magnification. The field of view at 50.3× magnification was 126 microns by 94 microns. All analysis was conducted using Vision 3D Analysis Software, Bruker Corporation, Tucson, Ariz. Because the Wyko is an interferometric measurement instrument that relies on capturing light scattered from the sample measurement error is introduced by high angle surfaces that do not scatter light efficiently into the optical system. In practice, the Wyko measurement error increases as more high aspect ratio features are present on a surface.

Scanning electron microscopy and EDS analysis: A Carl Zeiss Supra™ 55VP Scanning Electron Microscope was used to image both the as-sprayed and laser-treated $Cr_2O_3$. The microscope was operated at 5 kEv and a working distance of 7.5 mm, with varying magnification. Images were obtained using secondary (SE2) and backscatter (BSC) detection. Energy Dispersive X-ray Spectroscopy (EDS) was conducted using an Oxford X-Max detector and AZtec® software. The $Cr_2O_3$ sample was not coated prior to SEM imaging, as is common for insulating samples.

Focus ion beam analysis: An FEI Helios dual platform focused ion beam (FIB) tool equipped with both a $Ga^+$ ion column and a scanning electron microscope column was used to produce cross sections of the sample normal to the deposition surface for both SEM imaging with energy dispersive x-ray spectrometry (EDS) and TEM imaging with EDS. Localized Platinum deposition was used to protect the surface of the sample from direct ion beam irradiation. SEM samples were prepared of selected areas by milling trenches normal to the deposition surface. The sample was then imaged, and EDS was performed directly from the ion milled surface. Thin samples for TEM analysis were produced by the in situ lift-out technique. In this method, a selected area of the sample is cut free using the ion beam. The cut sample is transferred to a support grid where final ion thinning was conducted.

High resolution transmission electron microscopy: All scanning transmission electron microscopy was conducted with a FEI Company Titan G2 80-200 microscope outfitted with ChemiSTEM technology. The scope was operated at 200 kV using a high-brightness Schottky electron source and a spherical aberration corrector. A silicon drift detector (SDD) energy-dispersive x-ray detector array with a combined solid angle of collection of 0.7 steradians was used for all energy-dispersive x-ray analysis. All TEM samples were prepared and thinned using the same Focused Ion Beam microscope described above.

Solar property characterization: Solar absorptance a (solar weighted or $\alpha_{solar}$) measurements were performed on a Device and Service Company solar spectrum reflectometer that was calibrated with a white diffuse standard (α=0.198) and was weighted to provide a measurement spectrum of that closely approximates the air mass solar spectrum. Thermal emittance ($\varepsilon_{80° C.}$) measurements were performed using an AZ Technologies Temp 2000 infrared reflectometer with an 80° C. black body source. A gold standard ($\varepsilon$=0.02) and a black standard ($\varepsilon$=0.908) were used to calibrate the instrument. Diffuse reflectance (absorptance, $\alpha_{Ultraviolet}$)

from wavelengths of 200-2400 nm and emittance at 2400 nm ($\epsilon_{2400\ nm}$) were measured at room temperature on a Shimadzu UV-3600 IV/VIS/NIR Spectrophotometer. A BaSO$_4$ reference standard was used for calibration.

The performance of each test coupon was ranked using a figure of merit (FOM) defined by the following equation:

$$FOM = \frac{\alpha_{solar}Q - \varepsilon\sigma(T^4 - T_{surr}^4)}{Q}, \quad (Eq.\ 1)$$

where $\alpha_{solar}$ is the solar absorptance, Q is the concentrated solar irradiance on the receiver (assumed to ~60 W/cm$^2$ or ~600 suns), $\epsilon$ is the emittance, σ is the Steffan-Boltzmann constant (5.67×10$^{-12}$ W/cm-K$^4$), T is the surface temperature of the receiver (assumed to be 973 K), and T$_{surr}$ is the temperature of the surroundings (assumed to be 293 K).

As an approximation, the emittance at the assumed surface temperature was calculated to be the average of the emittance at 80° C. ($\epsilon_{80°\ C}$, from the IR reflectometer) and the emittance at 2400 nm ($\epsilon_{2400\ nm}$, from diffuse reflectance). The emittance from diffuse reflectance is assumed to equal the absorptance at these wavelengths according to Kirchhoff's Law. The emittance term provides an estimate of the average value of this property over the wavelength spectrum of interest from the data generated and is meant for comparison purposes only. The numerator in the FOM is the net absorbed radiation by the receiver, and the denominator is the net absorbed radiation by an ideal absorber ($\alpha_{solar}$=1, $\epsilon$=0). This figure of merit recognizes that maximizing absorptance at the receiver does more to improve SPT efficiency than minimizing the emittance from the receiver at the irradiance and surface temperature being considered.

Results

The as-sprayed Cr$_2$O$_3$ coating samples were dark green and exhibited a figure of merit ranging from 0.80-0.83 (Table 3). The as-sprayed LSM sample was black and exhibited a figure of merit of 0.82 (Table 3). These figures of merit are reasonable, but not good enough to warrant consideration by themselves. Other investigators have reported improvements in absorptivity after roughening a surface (see, e.g., Brown R J C et al., *J. Mater. Chem.* 2002; 12:2749-54). Thus, roughening of both surfaces using a femtosecond laser was explored.

Figure 2:
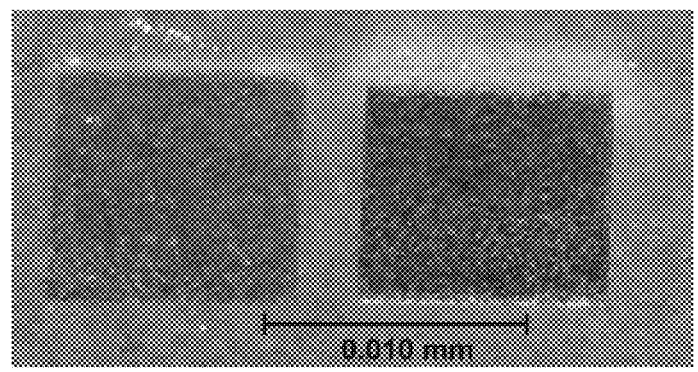
FIG. 2 shows a $Cr_2O_3$ plasma sprayed coating with two areas treated by a laser. The two black squares are the laser-treated regions. The square on the right was treated at twice the laser power level used to create the square on the left. The lighter surrounding area is the as-sprayed $Cr_2O_3$ coating.
Figure 3:
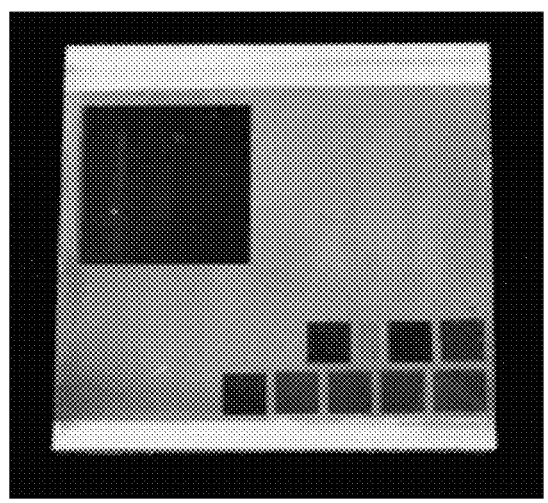
FIG. 3 shows a $Cr_2O_3$ sample after second laser treatment showing the larger ¾"×¾" area (upper left corner). The smaller dark areas in the lower right hand corner are the initial laser-treated regions.
Figure 4:
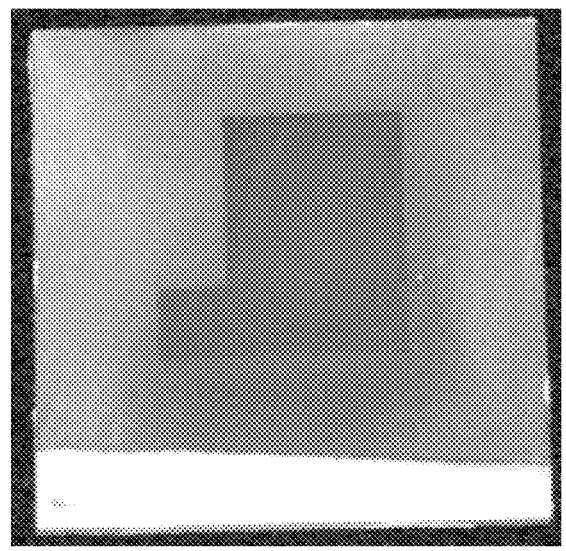
FIG. 4 shows a 2"×2" lanthanum strontium manganite (LSM) sample after laser-treatment showing significant darkening in response to laser treatment. The laser-treated region is the "J" shape in the center of the sample.

Laser treatment results: Laser-treatment of the Cr$_2$O$_3$ coating was accomplished by rastering an 800 nm femtosecond laser across the coating surface in air. The 0.010 mm×0.010 mm features in FIG. 2 were created using Set Point 1 in Table 2 (left region in FIG. 2) and Set Point 2 in Table 2 (right region in FIG. 2). Because of the significant darkening that was observed, a larger area (~¾"×¾") was laser-treated using Set Point 2 in Table 2. This larger feature, shown in FIG. 3, was created to provide sufficient sample area for measurement of optical properties. It was also analyzed to determine the mechanism responsible for the color change. A similar procedure was used to laser-treat the LSM surface (FIG. 4). As with the Cr$_2$O$_3$, laser-treatment caused visible darkening of the LSM surface.

Solar performance (FOM) measurements: Solar absorptance and emissivity measurements were made in both the as-sprayed and laser-treated regions of the Cr$_2$O$_3$ and LSM samples. These data and the calculated Figure of Merit are shown in Table 3. For comparison purposes, samples of Pyromark®-2500, deposited and cured according to manufacturer specifications have a relative FOM of 0.89, when measured using the same technique (Ho C K et al., "Characterization of Pyromark 2500 for high-temperature solar receivers," *Proc. ASME* 2012 *Energy Sustainability and Fuel Cell Conference*, San Diego, Calif., Jul. 23-26, 2012, Paper No. ES2012-91374, pp. 509-518).

TABLE 3

Solar property measurements comparing the as-sprayed and laser-treated coatings

| Sample | $\alpha_{solar}$ | $\epsilon_{80°C}$ | $\epsilon_{2400nm}$ | FOM |
| --- | --- | --- | --- | --- |
| Cr$_2$O$_3$ #1 As-Sprayed | 0.902 | 0.866 | 0.876 | 0.829 |
| LSM #1 As-Sprayed | 0.893 | 0.857 | 0.863 | 0.821 |
| Cr$_2$O$_3$ #1 Laser-Treated | 0.959 | 0.854 | 0.927 | 0.885 |
| Cr$_2$O$_3$ #2 Laser-Treated | 0.941 | 0.743 | 0.838 | 0.875 |
| Cr$_2$O$_3$ #3 Laser-Treated | 0.954 | 0.733 | 0.902 | 0.886 |
| Cr$_2$O$_3$ #4 Laser-Treated | 0.948 | 0.759 | 0.900 | 0.879 |
| LSM #1 Laser-Treated | 0.958 | 0.898 | 0.675 | 0.892 |

The solar absorptance measurements in Table 3 show that both the laser-treated Cr$_2$O$_3$ and LSM surfaces exhibit a FOM similar to Pyromark®-2500 (FOM=0.89). These data also show that in both cases solar absorptivity increased more than emissivity decreased. These results are extremely important because laser-treated Cr$_2$O$_3$ and LSM are both ceramic materials and, thus, are likely to be significantly more durable at high temperature than organic based Pyromark®-2500.

Samples #2-4 in Table 3 were laser-treated using Set Point 3 in Table 2. One of these sample (sample #2), was left over from an earlier thermal aging experiment. During that experiment, the Cr$_2$O$_3$ sample was thermally aged in air at 600° C. for two weeks, at 700° C. for two weeks, and then at 800° C. for four and one half days. Interestingly, the thermally-aged sample did not perform significantly differently after laser-treatment when compared to the un-aged samples. This suggests that laser-treatment could be used to "refresh" a Cr$_2$O$_3$ coating if its optical properties degrade during use on a power tower.

Before determining that laser-treated Cr$_2$O$_3$ and LSM actually are alternatives to Pyromark®-2500 the long term (about 30 years) thermal stability of these surfaces must be assessed. Identification of the microstructural features responsible for the observed solar property changes are critical because this will identify what must be evaluated in order to predict aging behavior. The samples shown in FIGS. 3-4 were analyzed with the goal of identifying these microstructural features. This analysis is reported below. The Cr$_2$O$_3$ coating was analyzed first, and these data were used to inform analysis of the LSM sample. As a result the LSM sample was analyzed using STEM only.

X-ray diffraction results: Both the as-sprayed and laser-treated regions shown in FIG. 3 were examined using X-Ray Diffraction (XRD). The XRD analysis was intended to identify any gross phase or chemical change that could be associated with the color change from green to black in the laser-treated region.

XRD data confirmed that both the as-sprayed and laser-treated regions had expected crystal lattice parameters. For instance, these data confirmed the presence of Cr$_2$O$_3$ with the expected crystal lattice parameters for the as-sprayed region (a=4.957(2) Å, c=13.556(9) Å, vol=288.5 Å$^3$) and the laser-treated region (a=4.956(2) Å, c=13.55(1) Å, vol=288.3 Å$^3$). Neither the as-sprayed nor the laser-treated Cr$_2$O$_3$ coating contained any contamination detectable using XRD. Furthermore, lattice parameter refinement for both the as-sprayed and laser-treated regions showed little difference in the Cr$_2$O$_3$ unit-cell size. These data demonstrate that the observed changes in the coating optical properties cannot be attributed to either a gross chemical change or a gross phase transformation.

Figure 5A:
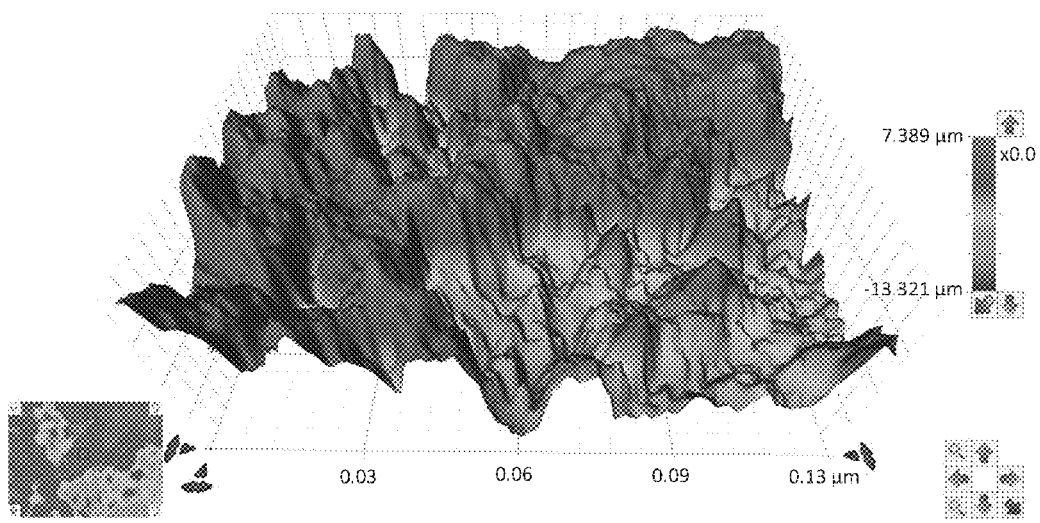
FIG. 5A-5B shows three dimensional maps of surface roughness for (A) the as-sprayed $Cr_2O_3$ surface and (B) the laser-treated $Cr_2O_3$ surface. These data show that no macroscale difference in roughness exists between the two surfaces.
Figure 5B:
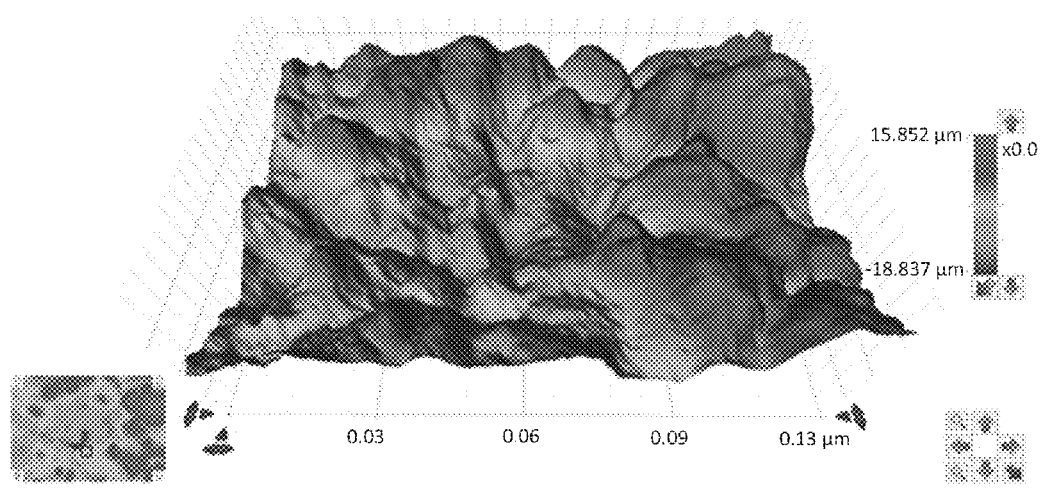

Surface roughness results: The surface roughness of the as-sprayed and laser-treated $Cr_2O_3$ coating regions was characterized to determine if the meso-scale (1-10 microns) surface roughness differences could be responsible for the change in optical properties. Both regions contain high aspect ratio features that introduce error in the Wyko surface roughness measurement. Nevertheless the data were informative. Three areas were measured in each coating region. Representative data are shown in FIG. 5A-5B. Table 4 summarizes the average roughness ($R_a$) data for all six measured areas.

TABLE 4

Average Roughness ($R_a$, microns) data showing little meso-scale roughness difference exists between the two surfaces

| Measurement | As-Sprayed | Laser treated |
|---|---|---|
| 1 | 2.67 | 4.23 |
| 2 | 2.63 | 2.77 |
| 3 | 3.11 | 2.61 |
| Average | 2.80 | 3.20 |

Despite the measurement error associated with interferometric characterization of this sample, these roughness data demonstrate that the as-sprayed and laser-treated regions have similar meso-scale roughness. Thus, a meso-scale roughness difference is not responsible for the change in optical properties. The sample was further analyzed using scanning electron microscopy (SEM).

SEM and energy dispersive x-ray spectroscopy results: Secondary electron image spanning both the as-sprayed and laser-treated regions confirmed the optical interferometry based conclusion that no gross difference in meso-scale surface roughness was associated with the laser treatment.

Figure 6:
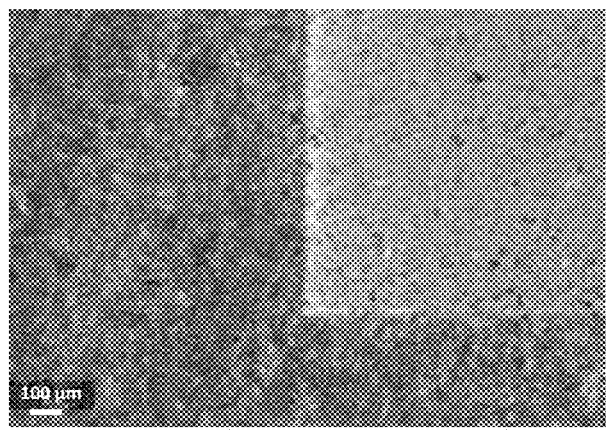
FIG. 6 shows a backscattered electron (BSC) image of the as-sprayed (left region) and the laser-treated (right region) $Cr_2O_3$ surface. This image suggests that a surface chemistry difference exists between the as-sprayed and laser-treated regions. This however, is not the case, the apparent surface chemistry difference is an EDS artifact created by nanostructures on the laser treated surface.
Figure 7:
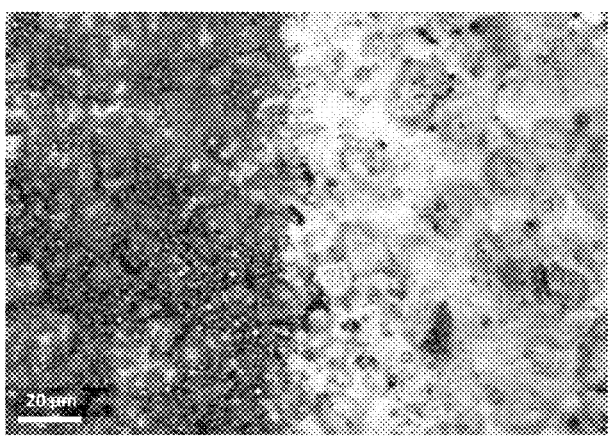
FIG. 7 shows a high magnification BSC image of the as-sprayed (left region) and the laser-treated (right region) $Cr_2O_3$ surface.

FIG. 6 shows a backscattered electron (BSC) image of as-sprayed (left region) and laser-treated (upper right quadrant) surfaces. Contrast in a BSC image generally results from atomic species differences at the near surface region with bright areas having higher atomic number (more backscattering) than dark areas (less backscattering). This image suggests that a surface chemistry difference between the as-sprayed $Cr_2O_3$ and the laser-treated region exists. FIG. 7 is a higher magnification backscattered electron image showing both the as-sprayed and the laser-treated regions of the $Cr_2O_3$ coating. The as-sprayed surface appears to be covered with a low atomic number material that is not present in the laser-treated region.

Figure 8:
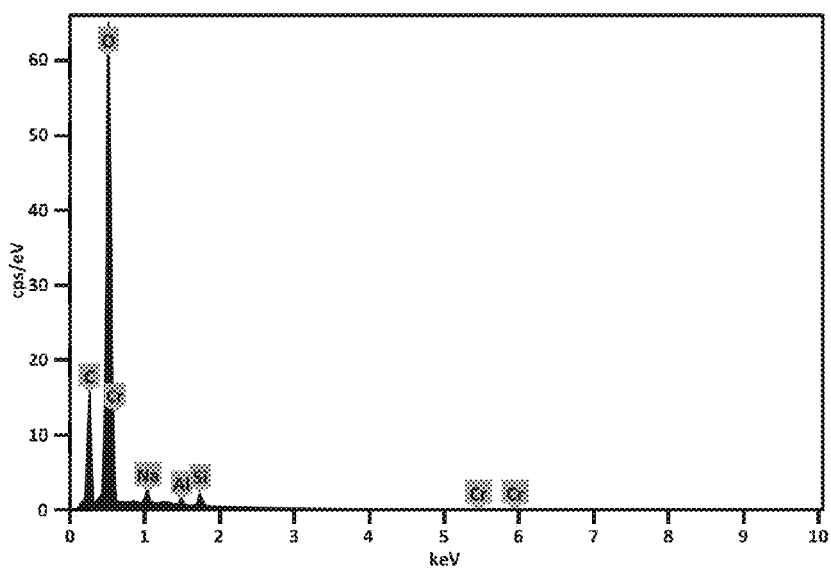
FIG. 8 is a graph showing a summarized Energy Dispersive X-Ray Spectroscopy (EDS) spectrum from a laser-treated $Cr_2O_3$ surface. The sodium, aluminum, and silicon peaks (Na, Al, Si, respectively) are small enough to be background contamination in the $Cr_2O_3$ feed stock. The oxygen and chromium peaks (O and Cr) are expected in a $Cr_2O$ sample. The carbon peak (C) is significant and unexpected. The C peak is in fact an EDS artifact created by nanostructures on the laser treated surface.

An Energy Dispersive X-Ray Spectroscopy (EDS) map of the area shown in FIG. 7 was used to identify the atomic species present on the $Cr_2O_3$ coating surface. FIG. 8 shows a summary spectrum identifying the species present on the coating surface shown in FIG. 7.

EDS maps of the region in FIG. 7 showed the distribution of a single element (Na, Si, Cr, O, or C). Carbon is the only element that is identified in significantly different quantities in the as-sprayed region and laser-treated regions suggesting that a carbon containing material has been removed from the surface by laser-treatment. It is important to note that a carbon containing material may not actually be present on the surface. There is no carbon source in the APS process or the fused and crushed $Cr_2O_3$ feed stock. Previous experiments involving thermal aging of plasma sprayed $Cr_2O_3$ coatings at temperatures between 600° C. and 800° C. for times up to two weeks did not cause sample darkening or increase in absorptivity. These temperatures would have removed any organic material on the coating surface. As will be shown below, no other analysis technique identified a carbon containing material on the $Cr_2O_3$ surface. However, microstructural features capable of creating artifacts in a backscattered image were identified.

Figure 9A:
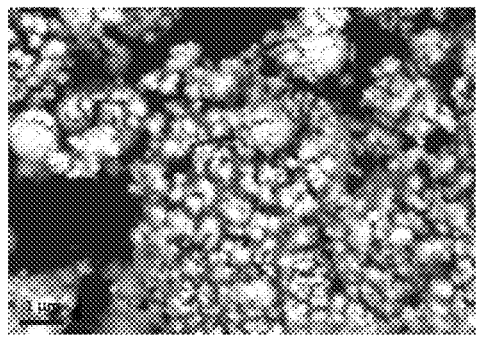
FIG. 9A-9B shows high magnification scanning electron microscopy (SEM) images for (A) the as-sprayed $Cr_2O_3$ surface showing high aspect ratio, sub-micron features and (B) the laser-treated $Cr_2O_3$ surface showing high aspect ratio sub-micron roughness.
Figure 9B:
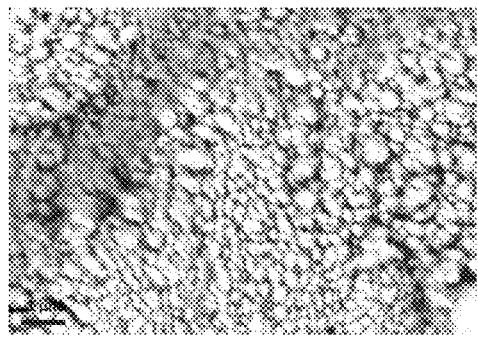

Surface morphology results: A high magnification SEM image showing the laser-treated surface revealed high aspect ratio sub-micron roughness (FIG. 9B). This extremely fine texture is characteristic of the laser-treated $Cr_2O_3$ surface. This surface is similar to the SuperBlack surface and may be responsible for the observed change in the laser-treated $Cr_2O_3$'s optical properties. Importantly, similar roughness appears to be present beneath the carbon containing material on the as-sprayed surface (FIG. 9A).

Focused ion bean cross sectioning results: An SEM equipped with a Focused Ion Beam (FIB) micro-machining capability was used to prepare cross sections of the as-sprayed and laser-treated $Cr_2O_3$. These cross sections revealed detail about the depth of the sub-micron surface roughness shown in FIG. 9B. The FIB was used to cut trenches approximately 25 microns long by 10 microns wide by 5 microns deep at three locations. A thin layer of platinum was deposited over and around the area of interest prior to cutting. This platinum layer is necessary to preserve the surface microstructure and prevent surface charging during FIB cutting.

The sidewall step revealed by the FIB trench at the boundary between the as-sprayed and laser-treated regions suggests that the laser-treated region is lower than the as-sprayed surface. While this is not conclusive evidence that material has been removed by the laser treatment; when coupled with the SEM data above (FIG. 6), it strongly suggests that material has been removed by the laser-treatment.

Figure 10A:
FIG. 10A-10B shows SEM images of the focused ion beam (FIB) trench in the as-sprayed $Cr_2O_3$ region. The layer at the surface is platinum deposited to preserve the surface microstructure and prevent charging during FIB cutting. Shown are (A) lower and (B) higher magnification images. As can be seen, while some roughness is present on this surface, it is not uniform or high aspect ratio.
Figure 10B:
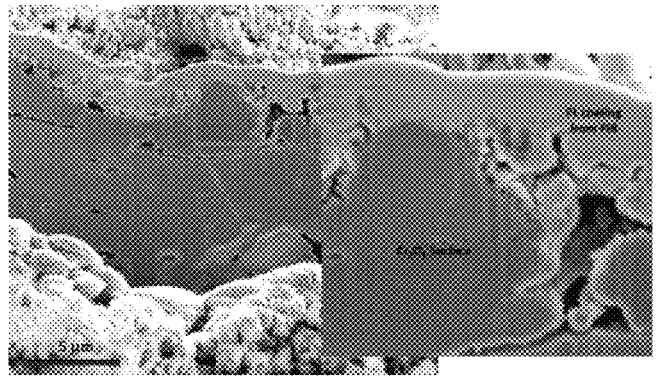

FIB trenches were also obtained in region well away from the boundary. The trench shown in FIG. 10A-10B was prepared in the as-sprayed region. This FIB trench revealed that regular, sub-micron, high-aspect ratio roughness was present on the as-sprayed $Cr_2O_3$ coating surface. Importantly, no carbon contamination was identified on the as-sprayed surface.

Figure 11A:
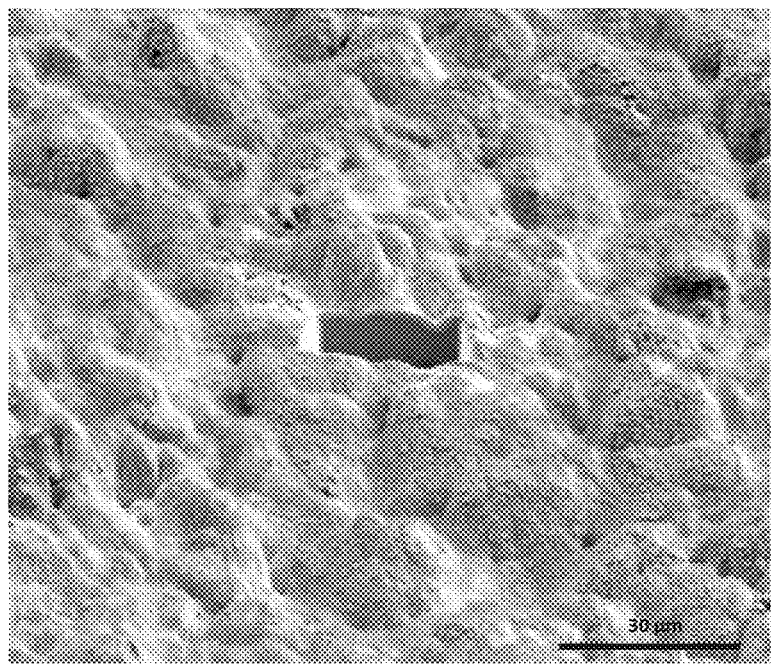
FIG. 11A-11B shows SEM images of the FIB trench in the laser-treated $Cr_2O_3$ region. The layer at the surface is platinum deposited to preserve the surface microstructure and prevent charging during FIB cutting. Shown are (A) lower and (B) higher magnification images. As can be seen, regular sub-micron roughness is visible at the $Cr_2O_3$ surface. This roughness appears to be consistent with the roughness observed in FIG. 9B.
Figure 11B:
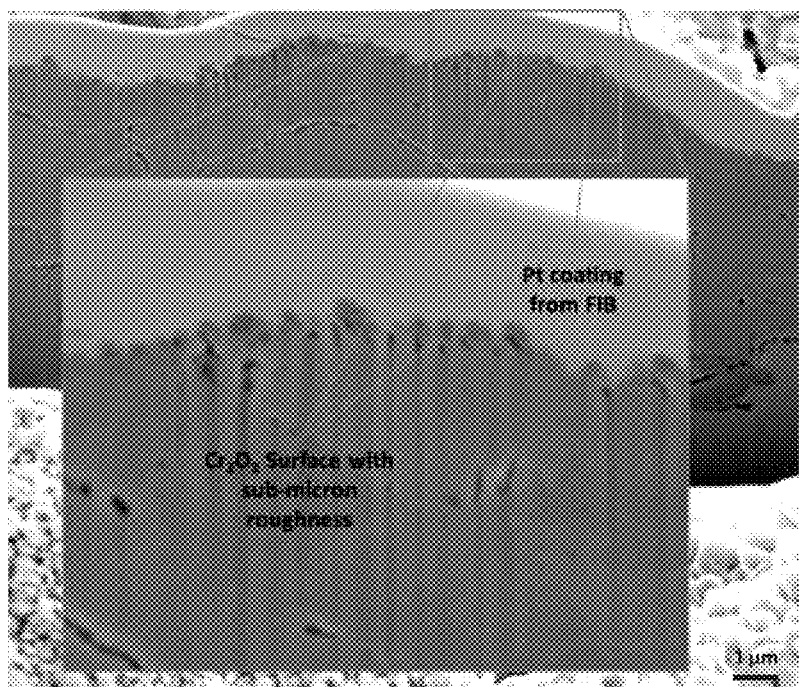

FIG. 11A-11B shows the FIB trench in the laser-treated region. This FIB trench revealed a regular, sub-micron, high-aspect ratio roughness on the laser-treated $Cr_2O_3$ coating surface. These data strongly suggest that the laser-treatment is creating this sub-micron roughness. Further examination of as-sprayed and laser-treated coating regions using high resolution transmission electron microscopy was used to determine if a chemical or phase change is present in the near surface region that could be responsible for the observed change in optical properties.

Figure 12A:
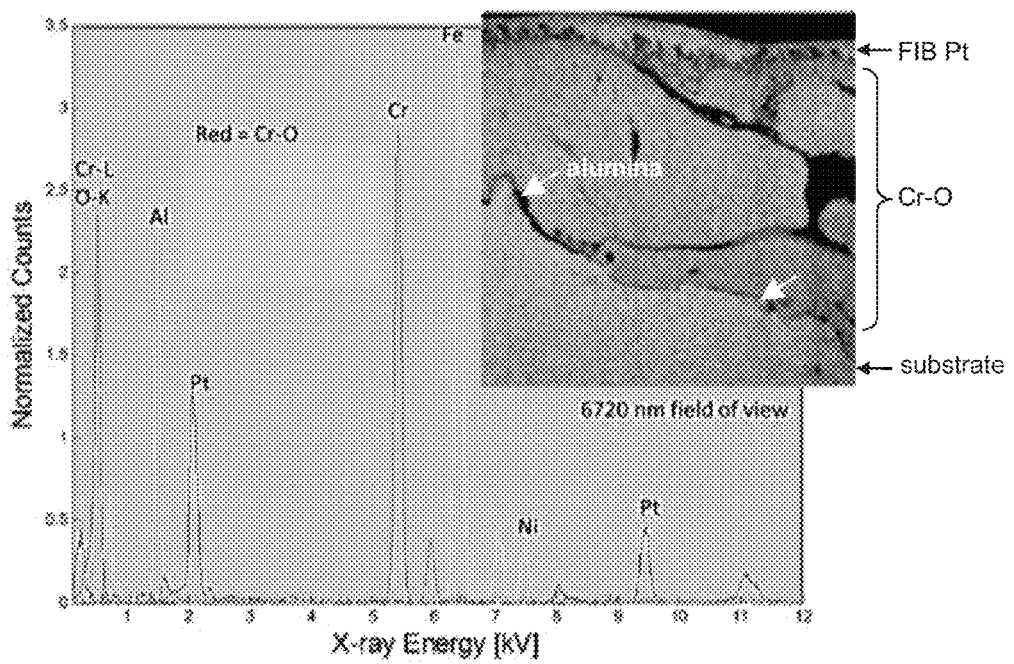
FIG. 12A-12F shows SEM and EDS analyses of the as-sprayed $Cr_2O_3$ surface. A: The EDS map confirms that both the $Cr_2O$ coating and the stainless steel substrate are visible in the as-sprayed Scanning Transmission Electron Microscopy (STEM) sample. B: The electron diffraction contrast image of the as-sprayed $Cr_2O_3$ sample shows that the columnar structures on the surface are related to the solidification structure in the $Cr_2O_3$ splats. C: The high magnification image of the as-sprayed $Cr_2O_3$ surface shows that the columnar structure is related to the underlying $Cr_2O_3$ grains. Elemental segregation at the $Cr_2O_3$ grain boundaries can also be seen. D: The EDS map shows combined Cr—O counts at the surface of the FIG. 12C region confirming that the columnar structures contain Cr and O. White indicates high Cr—O counts black indicates low Cr—O counts. The columns produce less signal because they are somewhat obscured by the Pt coating applied to the surface during the FIB cutting process. E: The high magnification electron diffraction contrast image of the as-sprayed $Cr_2O_3$ surface shows that the columnar structures are related to the underlying $Cr_2O_3$ grains. F: Another electron diffraction contrast image of the as-sprayed sample shows columnar structures at the surface and segregation at the $Cr_2O_3$ grain boundaries.

STEM results for $Cr_2O_3$ samples: Electron-transparent cross sections of the as-sprayed and laser-treated regions of the coating were prepared using the FIB. These cross sections were placed in a high resolution scanning transmission electron microscope (STEM) so that the sub-micron features on the coating surface could be further analyzed. In the as-sprayed $Cr_2O_3$ sample, the $Cr_2O_3$ surface was visible at the top of the image, and the stainless steel substrate is visible at the bottom of the image, as confirmed by the EDS map show in FIG. 12A. Columnar features can be seen clearly on the surface of the as-sprayed $Cr_2O_3$ sample. This is consistent with the sub-micron roughness noted in SEM images and FIB cross sections of the as-sprayed sample surface, FIGS. 9A and 10B.

Figure 12B:
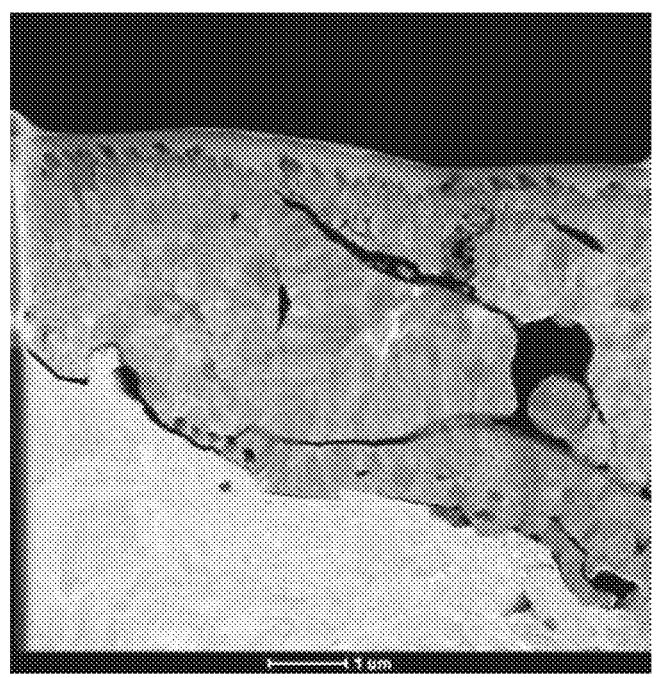

An electron diffraction contrast image of the as-sprayed sample is shown in FIG. 12B. In the electron diffraction image, differences in grain orientation are revealed as contrast. The columnar structures on the as-sprayed $Cr_2O_3$ surface appear related to the grains in the $Cr_2O_3$ splats. Specifically, they appear to have similar orientation to many of the visible grains and appear to be growing out of the surface grains. This suggests that the columnar structures are a product of the $Cr_2O_3$ splat solidification process. This orientation similarity can be more clearly seen in the high magnification image shown in FIG. 12C.

Figure 12C:
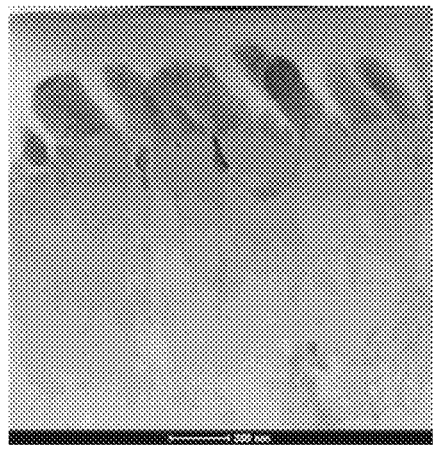
Figure 12D:
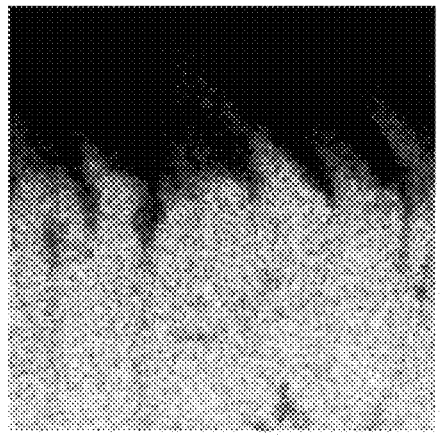
Figure 12E:
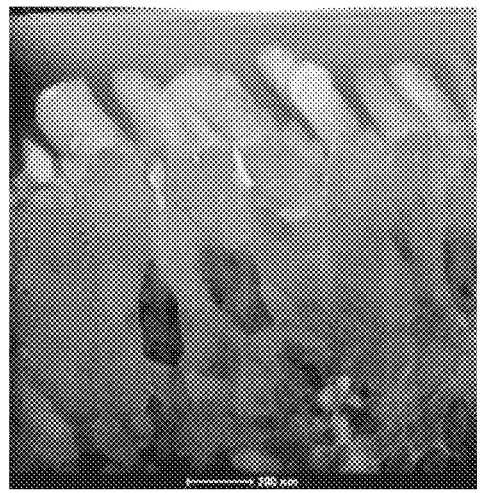
Figure 12F:
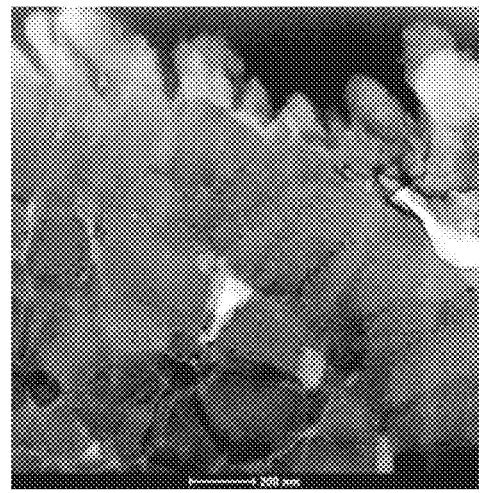

FIG. 12C is a high magnification (57,000×) image of the as-sprayed $Cr_2O_3$ surface. In this image the columnar structure can be seen to extend from the underlying $Cr_2O_3$ grain structure at the splat surface. The EDS map in FIG. 12D confirms that the columnar structure contains Cr and thus is presumably $Cr_2O_3$. This can be seen more clearly in the high magnification electron diffraction contrast images shown in FIG. 12E-12F. The $Cr_2O_3$ columns are ~250-300 nm tall and 50-150 nm wide. Impurity segregation, common in solidifying materials, can be seen as 10-20 nm clusters at the $Cr_2O_3$ grain boundaries in FIGS. 12C, 12E, and 12F. This material is likely normal impurity in the commercially pure $Cr_2O_3$ feedstock. There was no carbon present on the surface of this sample, as previously suggested by FIG. 6.

These columnar structures were oriented in similar directions, at an angle to the substrate normal. Due to the angle to the substrate normal and the high aspect ratio of these columnar structures, the previously collected data from multiple materials characterization tools were visited and reanalyzed. First, the results from Wyko surface roughness measurement did not capture the structure dimension of 250-300 nm tall and 50-150 nm wide. Second, the results from backscattered SEM images and elemental x-ray analysis from EDS/SEM are likely artifacts created by the spacing between the columns. The spacing between the columns are effectively pores and could create sufficient porosity in the electron interaction volume to reduce the effective atomic number an produce the backscattered electron contrast seen in FIG. 6.

Figure 13A:
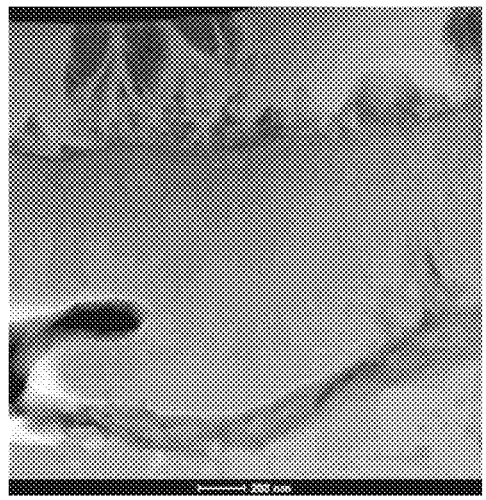
FIG. 13A-13F shows SEM and EDS analyses of the laser-treated $Cr_2O_3$ surface. A: Image of the laser-treated $Cr_2O_3$ sample. Fractal-like structures were seen at the coating surface. These structures did not have an orientation relationship to the underlying $Cr_2O_3$ grains. Sub-grain structure and solute segregation were visible in the underlying $Cr_2O_3$ grains. B: The STEM image of a second laser-treated $Cr_2O_3$ sample shows columnar nanostructures at the coating surface. The bulk of the surface of this sample was intact as evidenced by the Pt coating remaining on the majority of the sample surface. Higher magnification images of this surface are shown below. C: A higher magnification (40,000×) image is provided for the sample shown in FIG. 13B. Multiple columnar structures can be seen in this image. These columnar structures appeared to have structure consistent with FIG. 9B. D: Provided is the high magnification (115,000×) image of columnar nanostructures seen in FIG. 13C. The fine grained materials surrounding the columns is Pt deposited during the FIB sample preparation process. This confirms that these columnar nanostructures are on the free surface of the laser-treated $Cr_2O_3$ sample. Fine structure can be seen inside the columns suggesting that they have high surface area and a large number of interfaces capable of scattering photons. E: The high resolution EDS maps confirmed that the columnar structures in FIG. 13D contain both Cr and O and that they are surrounded by Pt. F: The high magnification (1,800,000×) image and Fourier transform of the Cr—O containing columnar nanostructure suggests that the Cr—O columnar nanostructure is either highly defective or amorphous as indicated by the lack of diffraction spots in the Fourier transform image.

FIG. 13A shows an electron diffraction contrast image of the laser-treated $Cr_2O_3$ sample. The brighter region at the left of the image was deliberately left thicker to support the thinner more electron transparent region to the right of the image. The sample orientation is such that the $Cr_2O_3$ coating surface is at the top of the image. Multiple columnar structures are visible. These columnar structures exhibit fractal-like structures similar to solidification dendrites and they do not show a clear orientation relationship to the $Cr_2O_3$ grains beneath them.

Figure 13B:
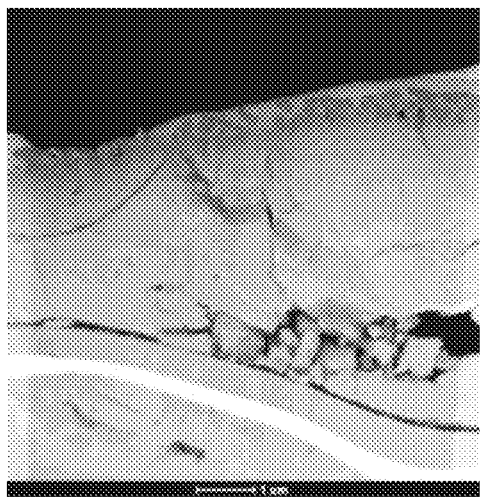
Figure 13C:
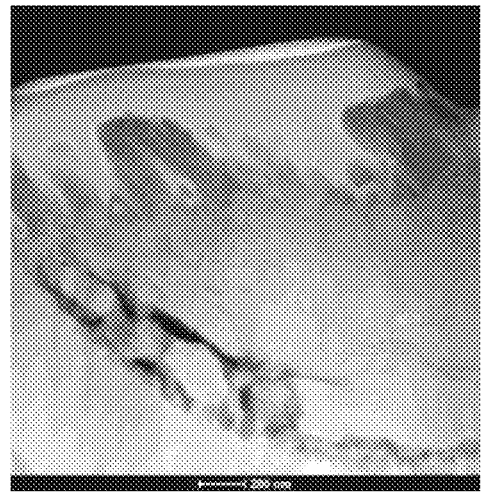

FIG. 13B shows a second laser-treated $Cr_2O_3$ TEM sample. The Pt coating visible on the sample surface confirms that the original $Cr_2O_3$ surface is intact on this sample. As in the damaged sample, columnar nanostructures are visible on the laser-treated $Cr_2O_3$ surface. A higher magnification image is shown in FIG. 13C. The columnar nanostructures clearly contain features within the columns. These features are best seen in FIG. 13D.

Figure 13D:
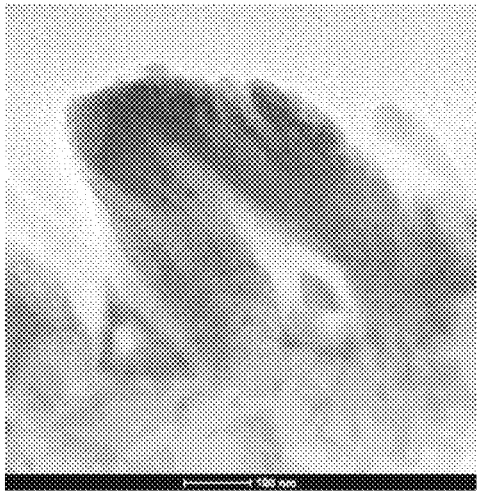
Figure 13E:
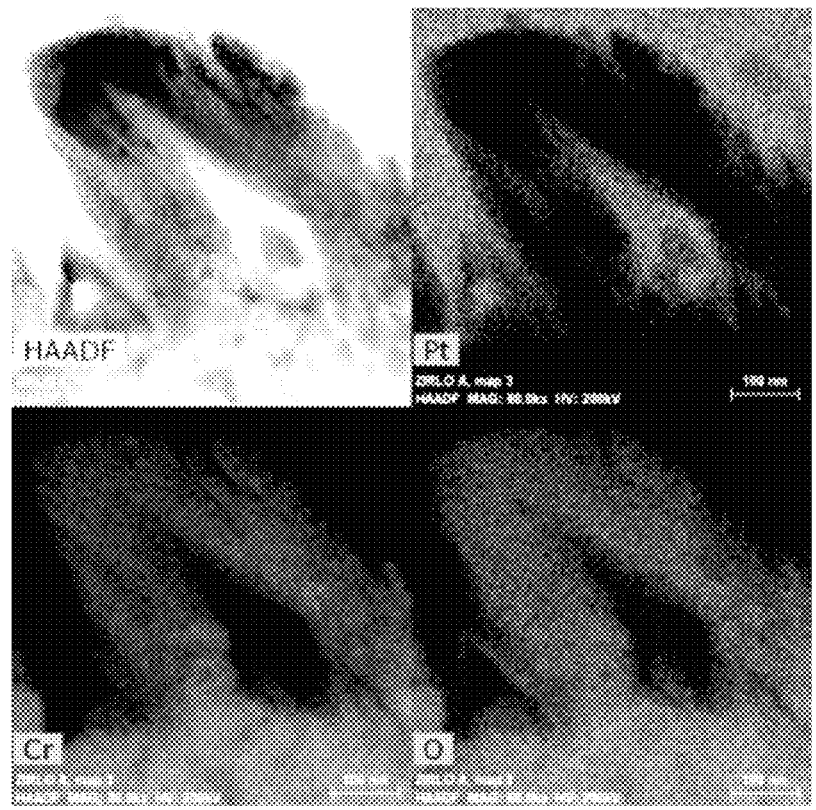
Figure 13F:
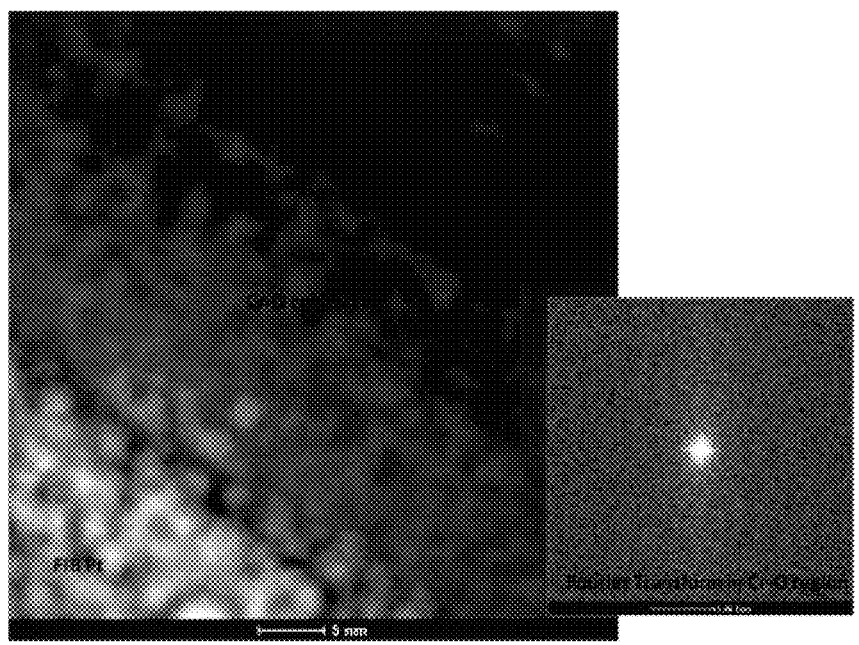

FIG. 13E provides EDS maps of the column shown in FIG. 13D. These maps confirm the presence of Cr and O in the columnar nanostructure as well as the presence of Pt surrounding the columnar nanostructures. A Fourier transform image taken in the columnar nanostructure at even higher magnification shows no diffraction spots, suggesting that the column is amorphous or highly defective (FIG. 13F).

Figure 14A:
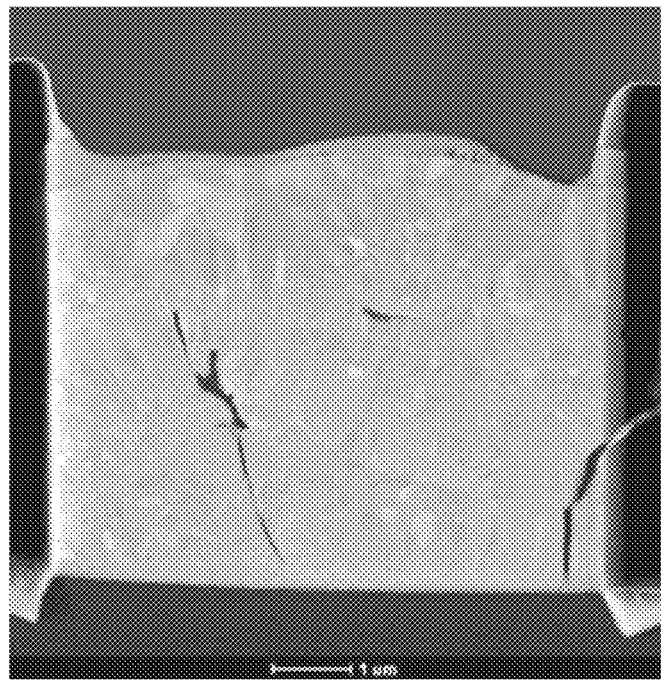
FIG. 14A-14C shows the as-sprayed LSM surface. A: Electron diffraction contrast STEM image shows the as-sprayed LSM sample. The majority of the sample surface was covered with E-beam Pt from the FIB sample preparation process confirming that the original surface is intact. The coating was dense and clean with the exception of some soot on the surface. B: The high magnification image (160,000×) of the LSM surface shows apparent dendritic segregation near the LSM surface. The area defined by the green square was analyzed using EDS to determine if chemical segregation is associated with the structure at the surface. Note: some atomic lattice fringes can be seen from the grain in the left side of this image. C: Provided are EDS maps taken from the area indicated in FIG. 14B. These maps confirm FIB Pt on the sample surface. They also confirm that Mn and La segregation is responsible for the columnar structures seen near the surface of the as-sprayed LSM coating.

STEM results for LSM samples: The as-sprayed LSM sample is shown in FIG. 14A. It is a dense coating with a lamellar structure typical of a plasma sprayed coating. The individual lamella contains grain structures that are largely vertical because the grains grow in the heat flow direction as the liquid droplets that form the lamella solidify. The majority of this sample surface is covered with Pt confirming that the coating surface is intact. A small amount of debris is visible on the coating surface.

Figure 14B:
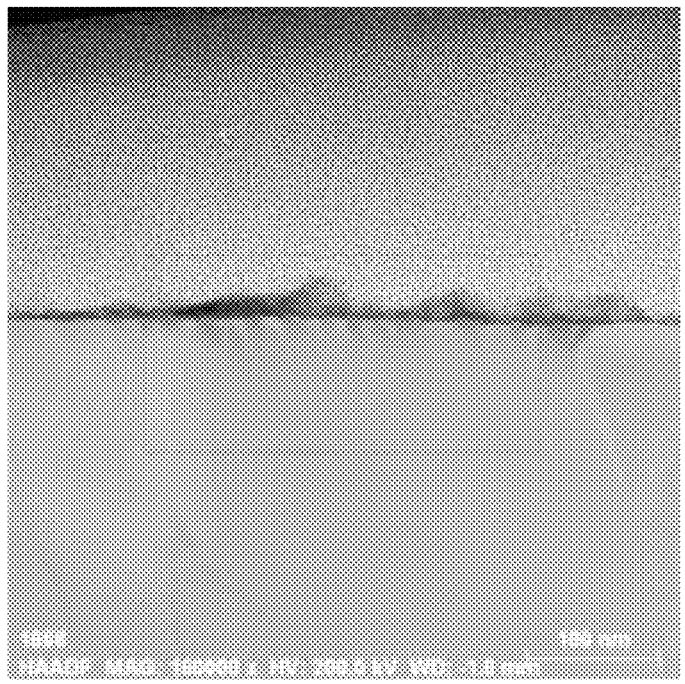
Figure 14C:
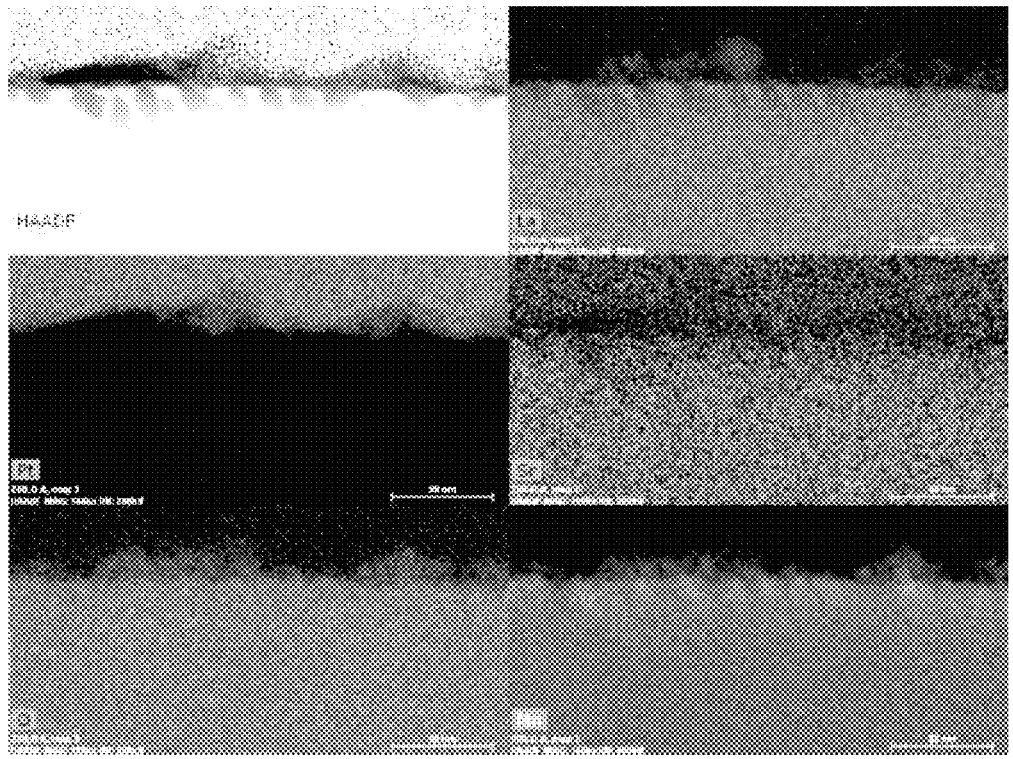

FIG. 14B shows a higher magnification image of the as-sprayed LSM surface. Contrast in this image is due to differences in electron absorption as the beam passes through the sample. Thus, the dendrite like structures just beneath the surface are most likely solute segregation associated with the LSM solidification. EDS analysis (FIG. 14C) confirmed that the dendritic regions are rich in La and that the interdendrite regions are rich in Mn.

Interestingly, FIG. 14B shows lattice fringes. Perovskites such as LSM typically have large unit cells making atomic resolution imaging possible. Atomic resolution images with EDS analysis confirmed that the as-sprayed LSM sample contains the expected ordered perovskite structure with La and Sr sharing a crystal plane and Mn-O occupying the other crystal plane.

Figure 15A:
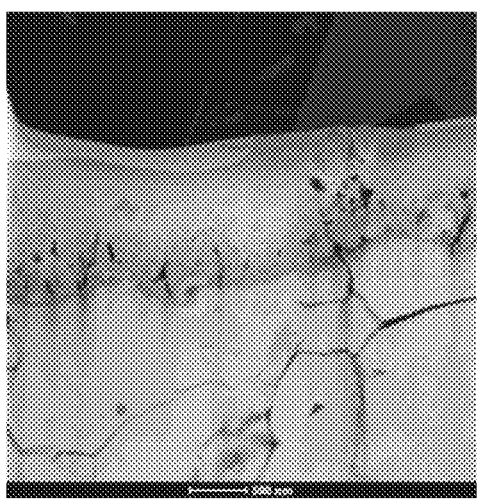
FIG. 15A-15C shows the laser-treated LSM surface. A: The STEM image shows a second sample taken from the laser-treated LSM coating. FIB Pt covers the entire surface of this sample confirming that the surface is intact. Considerable laser-induced structure can be seen on this surface. B: The higher magnification image (80,000×) of the laser-treated LSM surface shows the laser induced surface roughness and porosity. These features are small enough to interact with light and increase absorptivity. C: Provided are EDS maps of the laser-treated LSM surface shown in FIG. 15B. These maps strongly suggest that the observed surface texture and porosity is due to selective ablation of strontium and lanthanum. They also confirm the presence of FIB Pt on the sample surface.
Figure 15B:
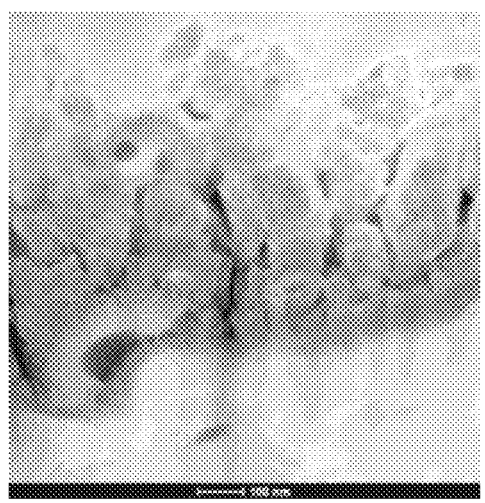
Figure 15C:
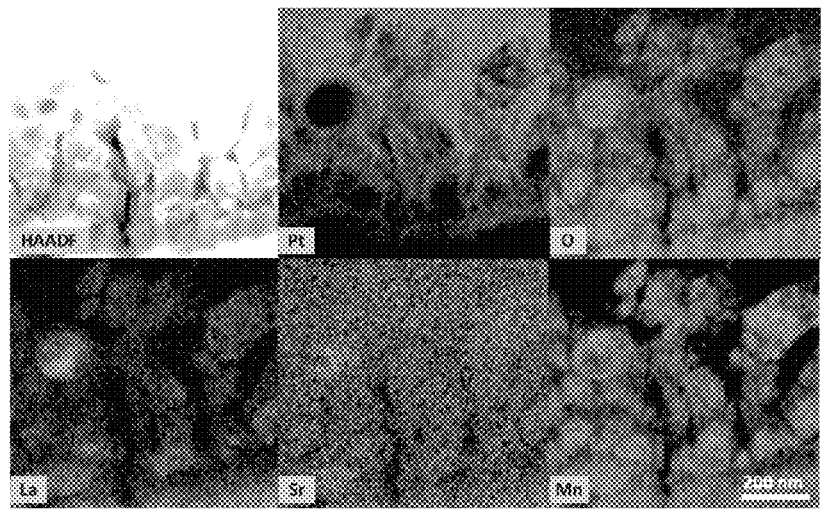

FIG. 15A shows one of two laser-treated LSM samples. Platinum is present on the surface of this sample confirming that the original LSM surface is present. The laser-affected zone in both LSM samples is significantly larger than the laser-affected zone in the $Cr_2O_3$ sample. FIG. 15B shows a higher magnification image of the laser-affected zone in the LSM sample. This sample has experienced significant ablation. LSM has a lower melting point than $Cr_2O_3$ and would be expected to have lower binding energy. Thus, the increased ablation is expected. EDS maps of the laser-affected zone (FIG. 15C) confirmed that selective ablation has occurred. The remaining material in the laser-affected zone is rich in Mn and O and is depleted in La and Sr.

Discussion

Optical measurements of multiple $Cr_2O_3$ samples clearly show that laser-treatment significantly improves Figure of Merit. Laser-treatment also improved Figure of Merit in LSM coatings. In both cases, the laser-treated coatings exhibit higher absorptance and slightly less emittance when compared to the as-sprayed samples. This is exciting because the laser-treated samples exhibit a Figure of Merit similar to Pyromark®-2500. Pyromark®-2500 is the baseline coating is known produce efficient power generation in CSP system. However, because Pyromark®-2500 is an organic coating it will not survive the 700° C. operating temperatures required by new CSP designs.

Chrome oxide is a high temperature ceramic material ($T_m$=2435° C.) that is routinely applied as a coating using plasma spray. Chrome oxide plasma sprayed coatings are recommended for service at temperatures up to 815° C. (Sulzer-Metco Technical Bulletin #10-658, "AMDRY® 6420 Chromium Oxide Powder For Wear Resistant Coatings," October 2000). Similarly, LSM coatings are routinely used at service temperatures up to 800° C. (1475° F.). Lanthanum Strontium Manganite is actually a family of perovskite materials with various specific compositions. Most LSM's exhibit melting points in excess of 1000° C. (Jiang S P, *J. Mater. Sci.* 2008 November; 43(21):6799-833).

Given this encouraging data, the long term thermal stability (about 30 years) of these laser-treated surfaces is now a key question. Because testing at 700° C. for 30 years is not practical; accelerated testing must be performed to determine if the laser-treated surfaces can be expected to exhibit stable optical properties for the service life of the CSP receiver. It is not sufficient to simply bake a laser-treated sample at high temperature for weeks or months and then measure its properties. Instead, accurate accelerated testing requires understanding the mechanism responsible any change in the properties when exposed to high temperature. In order to understand changes to the coatings properties at high temperatures, the mechanism responsible for the observed increase in absorptivity and reduction in emissivity after laser-treatment must be identified.

Analysis of both the as-sprayed and laser-treated $Cr_2O_3$ and LSM surfaces has been conducted. X-ray diffraction did not reveal any gross phase difference in the $Cr_2O_3$ samples. Optical interferometry did not reveal any gross differences in the $Cr_2O_3$ meso-scale surface roughness. Scanning electron microscopy revealed a visible texture difference between the two $Cr_2O_3$ surfaces. The as-sprayed $Cr_2O_3$ surface appeared rougher and more porous, and produced less backscattered electron contrast than the laser-treated surface. Initial EDS in the SEM analysis identified carbon on the as-sprayed $Cr_2O_3$ surface but not on the laser-treated surface. Analysis of the $Cr_2O_3$ feed stock powder demonstrated that no carbon is present in the feed stock. There is no other carbon source associated with the TriplexPro®-210 APS torch. No other analysis techniques, including glancing angle XRD and STEM, were able to detect carbon on the sample surface.

Focused ion-beam analysis revealed sub-micron roughness on both the as-sprayed and laser-treated surfaces. Further analysis of this sub-micron roughness with STEM revealed regular columnar structures on the as-sprayed $Cr_2O_3$ surface. Electron diffraction contrast images show that these columnar structures have crystallographic orientation similar to the $Cr_2O_3$ that they appear to grow from. They are thus associated with the splat solidification front and are characteristic of early stage dendritic solidification. Without wishing to be limited by mechanism, we believe that the large amount on interstitial space (void) associated with the nano-sized columnar surface texture created an artifact that is responsible for the reduced backscatter contrast and the identification of carbon by the SEM's EDS system (FIG. 6). Evidence of impurity segregation due to dendritic solidification was also found on the as-sprayed LSM surface, however no columnar nanostructures were present on this as-sprayed surface.

When the laser-treated surfaces were analyzed, different surface morphologies were revealed. The laser-treated $Cr_2O_3$ surface is populated with fractal-like columnar structures that do not have an orientation relationship with the underlying $Cr_2O_3$ grains. They clearly contained significant nano-meter scale features not present in the columns on the as-sprayed surface. The formation of similar nanostructures as a result of femtosecond laser-treatment has been reported on silicon and titanium surfaces (Tsukamoto M et al., "Periodic microstructures produced by femtosecond laser irradiation on titanium plate," *Vacuum* 2006 September; 80(11-12):1346-50; and Haberfehlner G et al., "Selenium segregation in femtosecond-laser hyperdoped silicon revealed by electron tomography," *Microsc. Microanal.* 2013 June; 19(3):716-25). Nanostructure formation in these cases was due to selective ablation by the femtosecond laser pulse not melting of the surface. Variations due to surface chemistry, laser polarization vector, and laser fluence were reported to affect nanostructure morphology and periodicity (Tsukamoto M et al., *Vacuum* 2006 September; 80(11-12):1346-50).

The laser-treated LSM surface also exhibited a highly textured surface with nanoscale features, but not columns. EDS analysis showed evidence of selective La and Sr ablation. Without wishing to be limited by mechanism, these nanostructures are likely the most significant difference detected between the two surfaces. In both cases the features on the laser-treated surfaces are significantly smaller than the wavelength of light in the solar spectrum (250-2500 nm). The interfaces and defects associated with these nanostructured surfaces could easily scatter photons and increase absorptivity and decrease emissivity, consistent with Brown R J C et al., *J. Mater. Chem.* 2002; 12:2749-54.

Based on these experiments, a skilled artisan would understand that the coating process, figure of merit values, and coating stability could be further optimized. Stability at CSP operating temperatures is critical. For instance, aging studies can be used to monitor the morphological evolution of these $Cr_2O_3$ and LSM nanostructures at various temperatures and correlate any changes nanostructure morphology with changes in measured optical properties. Such data would allow meaningful prediction of relevant long term aging behavior of these unique surfaces. Because these nanostructures can be created using laser-treatment, they need not be stable for the lifetime of the tower. Instead, laser-treatment could be conducted in-situ on an annual or semi-annual basis. The in-situ laser-treatment process could be conducted at night while the tube sheet is not in operation.

Summary

Thick $Cr_2O_3$ coatings, prepared using the air plasma spray process, have been previously shown to have a good figure of merit (0.80-0.83) for Solar Power Tower applications. Here, laser surface treatment was used to improve the solar performance of both $Cr_2O_3$ and LSM coatings. Laser-treated $Cr_2O_3$ and LSM coatings exhibited figures of merit of 0.889 and 0.892, respectively. This is significant because these figures of merit are similar to Pyromark 2500 (FOM=0.89), the leading solar absorptive coating. Both $Cr_2O_3$ and LSM are expected to be significantly more durable at high temperature than Pyromark®-2500.

Analysis of both the as-sprayed and laser-treated $Cr_2O_3$ and LSM surfaces has been conducted. In particular, this analysis identified differences in the two surfaces that could cause the observed changes in Figure of Merit after laser-treatment. Analysis of sub-micron surface roughness with STEM revealed regular columnar structures on the as-sprayed $Cr_2O_3$ surface and evidence of solute segregation near the LSM surface. Both structures can be associated with the droplet solidification process inherent to the plasma spray process.

When the laser-treated surfaces were analyzed different surface morphologies were revealed. The laser-treated $Cr_2O_3$ surface was populated with fractal-like columnar nanostructures that do not have an orientation relationship with the underlying $Cr_2O_3$ grains. Nanostructure formation is thought to be due to selective ablation by the femtosecond laser pulse not melting of the surface. The laser-treated LSM surface also exhibited a highly textured surface with nanoscale features, but not columns. EDS analysis showed evidence of selective La and Sr ablation. These nanostructures are likely the most significant difference detected between the two surfaces. In both cases the features on the laser-treated surfaces are significantly smaller than the wavelength of light in the solar spectrum (250-2500 nm). The interfaces and defects associated with these nanostructured surfaces could easily scatter photons and increase absorptivity and decrease emissivity.

Future aging studies should attempt to monitor the morphological evolution of these unique surfaces at various temperatures and correlate any changes nanostructure morphology with changes in measured optical properties. Such data would allow meaningful prediction of relevant long term aging behavior of this unique surface.

Example 3

Aging Studies of as-Sprayed and Laser-Treated Coatings

Two surfaces were further analyzed in an aging study: (1) an as-sprayed LSM coating and (2) a laser-treated LSM coating. Thermal testing, as described below, has proven that LSM surface structures and optical properties are reasonably stable at temperatures up to 700° C. for up to 20 days.

Experimental Procedures

Thermal spray coating preparation: Coatings were prepared as described herein, e.g., in Example 2. In brief, all coatings were prepared using a TriplexPro®-210 air plasma spray torch outfitted with a Unicoat™ process controller and a 9MP-CL powder hopper (Sulzer-Metco, Inc. Westbury, N.Y.). The spray torch was mounted on an ABB IRB-6600 six axis robot, which controlled the spray path (raster pattern with a traverse speed of 800 mm/s) and standoff distance (about 152.4 mm). Coatings were prepared using a standard 9 mm nozzle and 1.8 mm powder injector (powder feed rate of 30 g/min, carrier gas of argon, feed stock powder of agglomerated and sintered LSM powder (($La_{0.8}Sr_{0.2})_{0.98}$ $MnO_3$)). The torch was operated at 400 A with an Ar plasma (gas flow of 46 SLPM).

Nanosecond-laser surface treatment: Prior to thermal exposure, all LSM coatings were laser-surface treated using an SPI G3 nanosecond laser operated at 5 W laser power (commanded), 50 kHz pulse frequency, and 200 ns laser pulse width. Surface treatment was accomplished by translating the ~50 micron diameter incident beam over the sample surface at 50 mm/s in a serpentine raster pattern with a nominal step size of ~40 microns.

Thermal exposure (thermal aging): Plasma sprayed and laser-treated LSM coating were thermally aged in ambient air for 480 hours at temperatures of 600° C., 700° C., and 800° C. by baking them in a laboratory oven.

Coating surface characterization: The LSM coating microstructures were characterized in three conditions: as-sprayed, laser-treated, and laser-treated with thermally aging. The thermally-aged sample was exposed to 700° C. ambient air for 480 hours (20 days). Two Scanning Electron Microscopes (SEMs) were used to characterize the sample surfaces. All samples were imaged using a Carl Zeiss Supra™ 55VP SEM at 10 kV and a working distance of 8.5 mm, with varying degrees of magnification. Images were obtained using secondary (SE2) and backscatter (BSC) detection. Energy Dispersive Spectroscopy (EDS) spectra were collected with an Oxford X-Max detector and AZtec® software. The EDS spectra enabled mapping of chemical species on the sample surfaces. An extreme high resolution FEI Magellan 400 SEM was used to characterize the LSM surface morphology because it's higher resolution enabled imaging the nanoscales LSM structures. The FEI Magellan 400 XHR SEM is the world's first Extreme High Resolution SEM. The Magellan 400 delivers unmatched surface sensitive imaging performance at sub nanometer resolution.

The LSM samples were predominately imaged at 5keV and 0.20 nA in Field Free mode. For most of the SEM images, the ETD (Everhart-Thornley Detector) was used. A few SEM images used the TLD (Through the Lens Detector). The CBS (Concentric BackScatter) Detector was used for the backscatter images. In both SEMs, all samples were imaged without any preparation or conductive surface coatings.

Solar property characterization: Optical properties (solar absorptance and thermal emittance) of the coatings were monitored before, during, and after aging. Optical property measurements made at times <480 hours were made by removing the samples from the furnace, allowing them to cool to room temperature, and measuring their properties. Solar properties were determined as described herein, e.g., in Example 2. In brief, the following measurements were obtained: solar absorptance a (solar weighted or $\alpha_{solar}$), thermal emittance ($\in_{80°\ C.}$), emittance at 2400 nm ($\in_{2400\ nm}$), and diffuse reflectance (absorptance, $a_{Ultraviolet}$).

The performance of each test coupon was ranked using a selective absorber efficiency $\eta_{sel}$ defined by the following equation:

$$\eta_{sel} = \frac{\alpha_{solar}Q - \varepsilon\sigma(T^4 - T_{surr}^4)}{Q}, \qquad (Eq.\ 2)$$

where $\alpha_{solar}$ is the solar absorptance, Q is the concentrated solar irradiance on the receiver (assumed to ~60 W/cm² or ~600 suns), $\in$ is the emittance, σ is the Steffan-Boltzmann constant (5.67×10⁻¹² W/cm-K⁴), T is the surface temperature of the receiver (assumed to be 973 K), and $T_{surr}$ is the temperature of the surroundings (assumed to be 293 K). The numerator in the $\eta_{sel}$ represents the net absorbed radiation by the receiver, and the denominator is the net absorbed radiation by an ideal absorber ($\alpha_{solar}=1$, $\in=0$).

RESULTS AND DISCUSSION

Solar absorptance and emissivity measurements were made on both the as-sprayed and laser-treated regions of the LSM sample. These data and the calculated solar selective efficiency are shown in Table 5. For comparison purposes, samples of Pyromark®-2500 (deposited and cured according to manufacturer specifications) exhibited $\eta_{sel}$ of 0.890, when measured using the same technique (see, e.g., Ho C K et al., "Characterization of Pyromark 2500 paint for high-temperature solar receivers," *J. Sol. Energy Eng.* 2013 July; 136(1):014502 (4 pp.)). The data in Table 5 show that the laser-treated LSM surface exhibits a FOM similar to Pyromark®-2500.

TABLE 5

Solar property measurements comparing the as-sprayed and laser-treated coatings

| Sample | $\alpha_{solar}$ | $\in_{80°C.}$ | $\in_{2400nm}$ | $\eta_{sel}$ |
|---|---|---|---|---|
| LSM #1 As-Sprayed | 0.893 | 0.857 | 0.863 | 0.821 |
| LSM #1 Laser-Treated | 0.958 | 0.898 | 0.675 | 0.892 |

When comparing laser-treated LSM to Pyromark®-2500, the long term (30 years) thermal stability of the laser-treated surface must be assessed. If the optical properties of the laser-treated LSM are not stable at CSP operating temperatures then the coatings are of little value. Short duration (480 hours), high temperature aging (up to 800° C.) studies were conducted to assess the thermal stability of LSM.

Figure 16A:
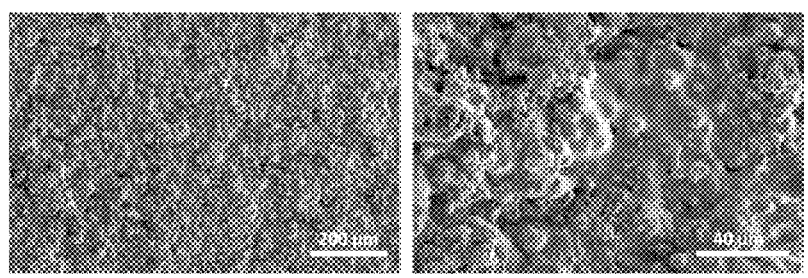
FIG. 16A-16C shows images of the (A) as-sprayed LSM surface, (B) laser-treated LSM surface, and (C) laser-treated, thermally-aged LSM surface. The surfaces are shown at two relatively low magnifications (left and right columns).
Figure 16B:
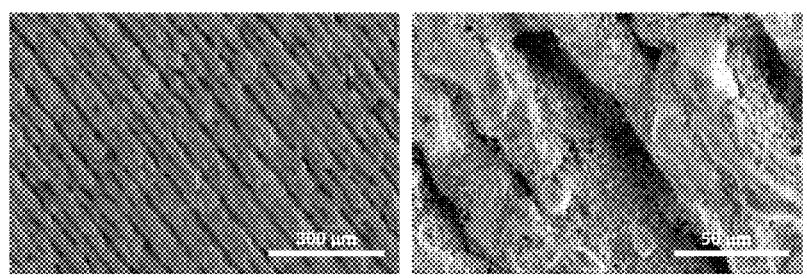
Figure 16C:
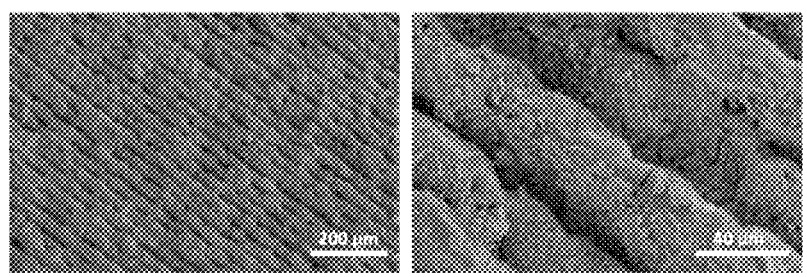

FIG. 16A-16C shows three LSM surfaces at two relatively low magnifications. As seen in FIG. 16A, the as-sprayed surface shows well melted droplets, microcracks, and partially solidified droplets, which are features typical of a thermal sprayed coating. In FIG. 16B-16C, the trenches resulted from material removal during laser treatment. The fine structured material on the sidewalls of the trenches is vaporized LSM that has re-deposited on the trench sidewalls during laser-treatment. The trenches and re-deposited materials create a fractal-like surface with micrometer-nanometer length scale features which strongly interact with photons and absorb solar energy efficiently. It is likely possible to optimize both the micrometer and nanometer length scale features to further improve solar selectivity using the nano-second laser treatment process.

Figure 17A:
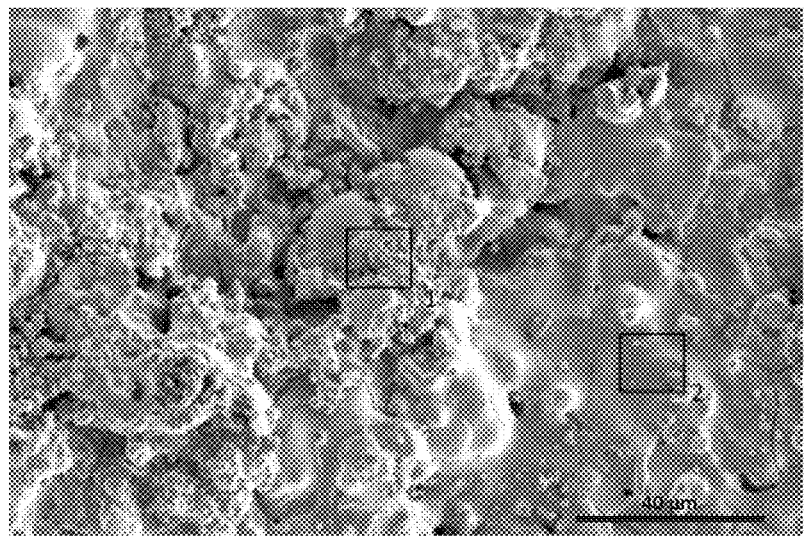
FIG. 17A-17C shows images of the as-sprayed LSM surface showing splats that solidified in flight (region 1 in (A) and images in (B)) and fully melted particles with solidification microcracks (region 2 in (A) and images in (C)).
Figure 17B:
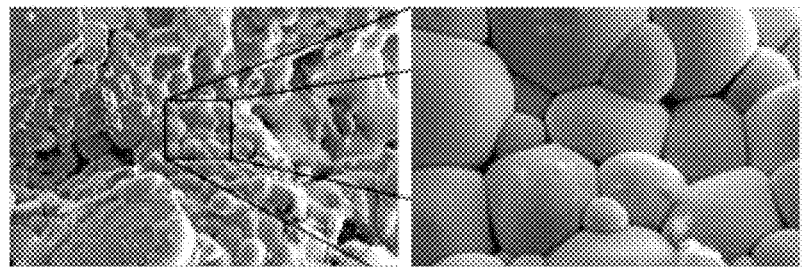
Figure 17C:
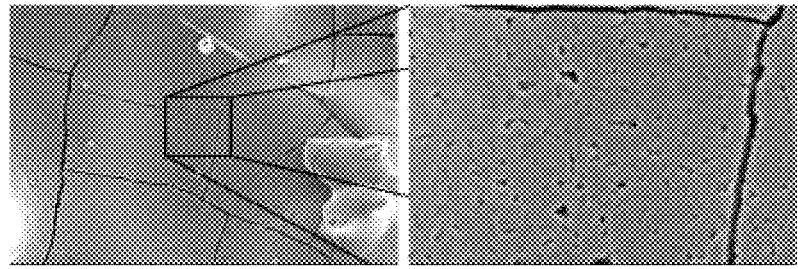

The as-sprayed LSM coating exhibited splat structures, indicating well melted droplets and partially solidified droplets (FIG. 17A-17C). The partially solidified droplets will give rise to some porosity in the coating (FIG. 17B). Solidification induced microcracking, which can in the coating surface (FIG. 17C). Neither feature will be detrimental to the coatings performance and may actually improve its strain tolerance.

In contrast, laser-treated coatings exhibited trench-like features (FIG. 16B-16C). Measurements of these trenches include a width of about 10 microns and a spacing of about 30 microns between trenches. They are a direct result of material removal during the nanosecond laser-treatment process. Comparison of the laser-treated and the laser-treated with thermally-aged samples showed that trench size and trench spacing had not changed.

Figure 18A:
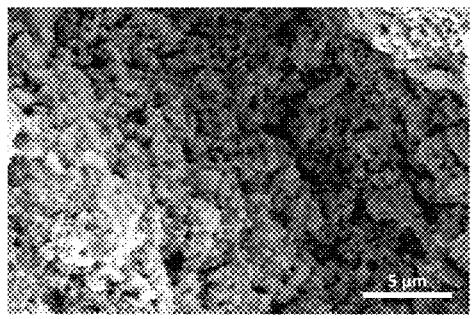
FIG. 18A-18B shows high magnification images of the laser-treated LSM surface. Shown are secondary electron (left) and backscattered (right) images.
Figure 18A:
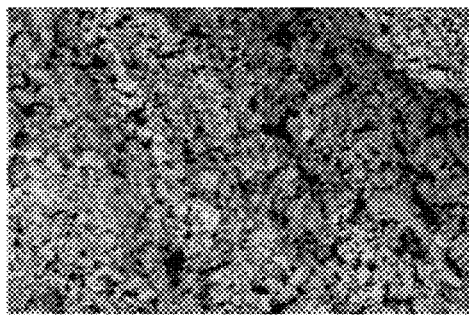
Figure 18B:
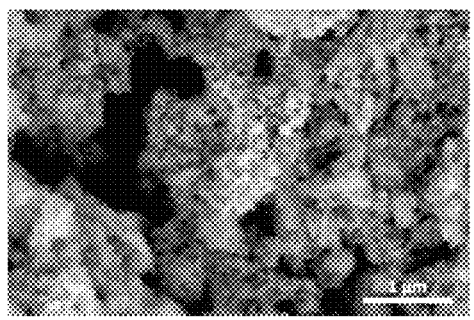
Figure 18B:
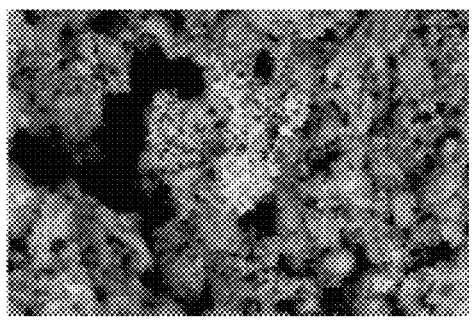

FIG. 18A-18B shows high magnification images of the re-deposited material at the bottom of a trench in laser-treated LSM. The surface of the re-deposited material is the surface of the bottom of the trench. The re-deposited material had a highly convoluted surface with considerable porosity, as well as micron and submicron features.

Figure 19A:
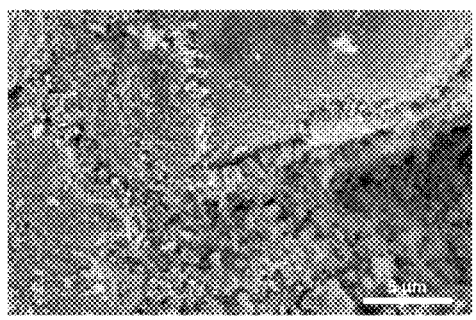
FIG. 19A-19B shows images of re-deposited material on the laser-treated LSM sample before aging. Shown are secondary electron (left) and backscatter (right) images.
Figure 19A:
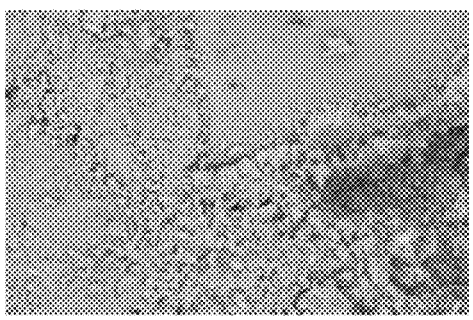
Figure 19B:
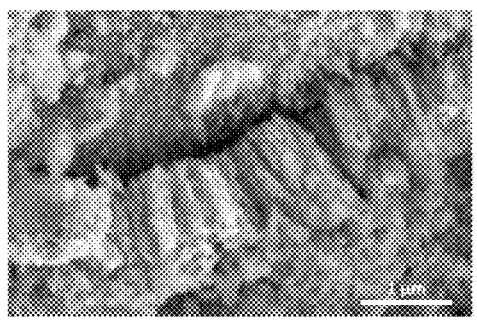
Figure 19B:
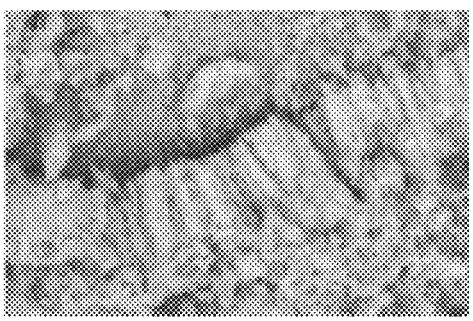
Figure 20:
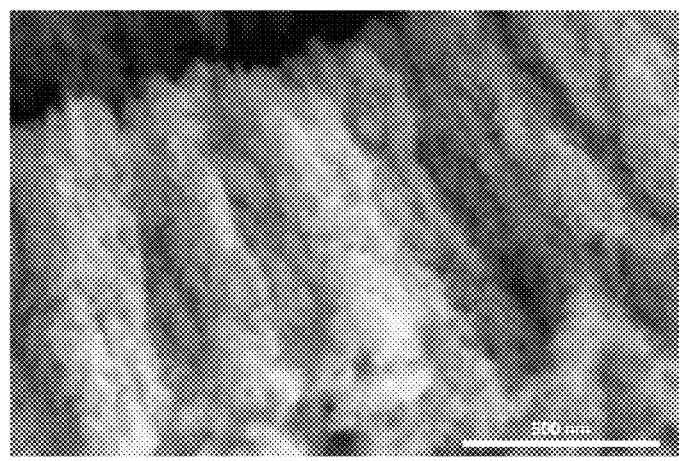
FIG. 20 shows a high magnification image of the re-deposited material on the laser-treated LSM surface. Extremely fine structure (<10 nm) was visible throughout the columnar structures.

Cross-sections of trenches and sidewalls were also imaged (FIG. 19A-19B), which showed re-deposited material visible on the trench sidewall. The backscattered electron images in FIG. 19A-19B (right) did not show contrast between the re-deposited material and the underlying LSM splats. This suggested that the re-deposited material's composition was similar to the underlying splats. The columnar microstructure visible in the re-deposited material suggested that it was deposited from vapor. As seen in FIG. 20, the even higher magnification image of the re-deposited material showed an extremely fine (<10 nm) structure throughout the columnar structures.

Thus, laser treatment has created an LSM surface with multiple length scales. The trenches are about 10 μm wide with about 30 μm wide spacing. The trench sidewalls are covered with a re-deposited layer having a thickness of about 1 μm. In addition, the re-deposited layer contained columnar structures with about 250 nm spacing, where these columnar structures in turn contained substructures with about 10 nm-sized features. Without wishing to be limited to mechanism, we believe that these variations in the re-deposited layer provide a multi-length scale surface, and this surface allows for interaction (and absorption) with incoming photons.

Figure 21:
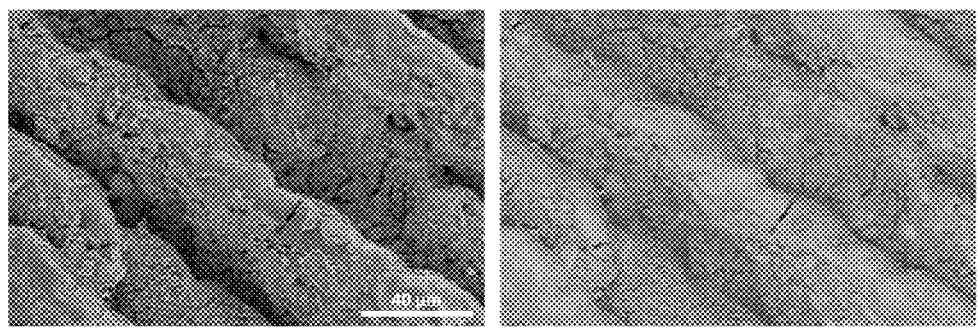
FIG. 21 shows images of the laser-treated, thermally-aged LSM sample. Provided are secondary electron (left) and backscattered (right) images, which show secondary deposited layers on the sidewalls and bottom of the aged trenches created by a nanosecond laser.

Thermal aging of laser-treated LSM surfaces were analyzed. FIG. 21 shows high magnification secondary electron and backscattered electron images of the laser-treated LSM surface after aging at 700° C. for 480 hours. The re-deposited material was still present after aging. Lack of contrast in the backscattered image suggested that no gross composition change had occurred in the re-deposited material during aging.

Figure 22A:
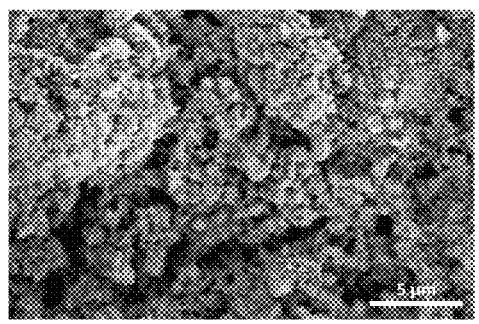
FIG. 22A-22B shows high magnification images of the laser-treated, thermally-aged LSM sample (aged at 700° C. for 480 hours). Provided are secondary electron (left) and backscattered (right) images. Some of the crystallites are indicated by white arrowheads.
Figure 22A:
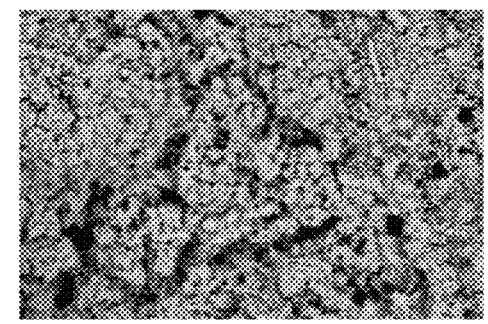
Figure 22B:
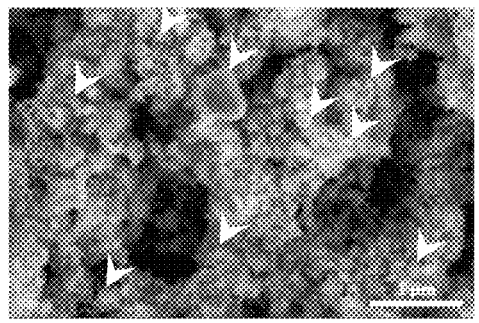
Figure 22B:
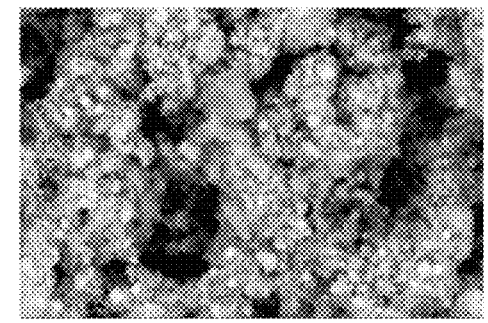

Higher magnification images showed the surface of the re-deposited material at the bottom of a trench (FIG. 22A-22B), which revealed porous, multi-scale surfaces similar to the surface observed before aging. Surprisingly, the fine (<10 nm) structure appeared to still be present. However, one important difference can be seen; crystallites are present throughout the re-deposited material (see, FIG. 22B, white arrowheads). Some measurements of these crystallites provided a width of from about 67 nm to about 436 nm.

Figure 23A:
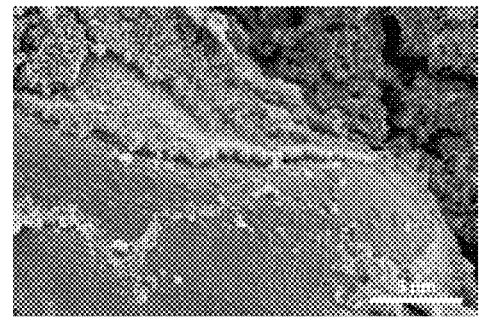
FIG. 23A-23B shows images of re-deposited material on the laser-treated, thermally-aged LSM sample. Shown are secondary electron (left) and backscatter (right) images.
Figure 23A:
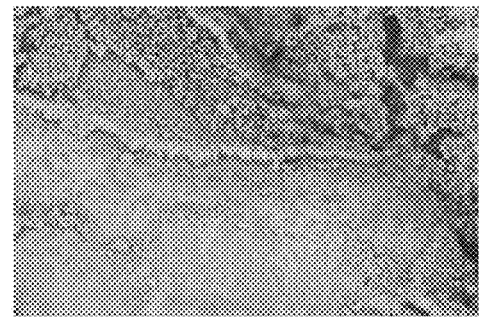
Figure 23B:
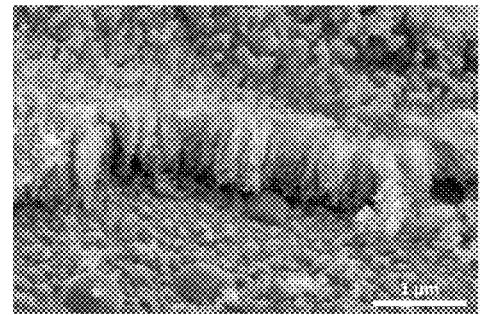
Figure 23B:
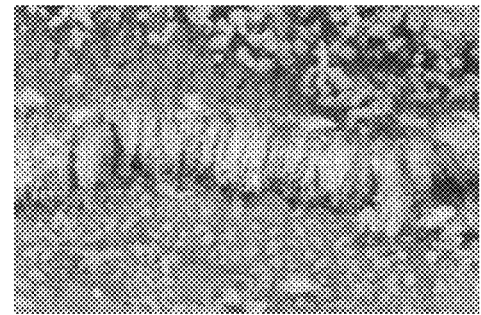

FIG. 23A-23B shows high magnification images of a cross-section of the re-deposited material visible on the trench sidewall after aging. Small (about 50-500 nm) crystallites were visible on top of the vapor deposited material and in the underlying splats. The backscattered electron images in FIG. 23A-23B clearly showed contrast between the re-deposited material, the crystallites, and the underlying LSM splats. This suggested that diffusion had occurred during aging and was responsible for the crystallite growth. This is not surprising during a 700° C., 480 hours thermal treatment. Interestingly, the columnar microstructure was still visible in the re-deposited material. The backscatter images also suggested that the secondary deposited material has higher atomic number than the background.

EDS analyses were also conducted on laser-treated, thermally-aged samples. Individual EDS maps for the aged LSM surface suggested that the crystallites may be slightly enriched in Mn. Analytical transmission electron microscopy can be conducted to further confirm the crystallite composition.

Summary

Many structural properties of the beneficial laser-treated surface was maintained after thermal aging. Much of the nanoscale (<10 nm) structure of the laser treated surface remained, and the micron-scale structure was undisturbed. One main difference included diffusion, which had occurred in the LSM coating during the 700° C., 480 hours anneal, resulting in moderate manganese segregation and growth of crystallites in the re-deposited material and on the LSM surface. Diffusion rates cannot be determined from this single sample, nor can equilibrium crystallite size. It is possible that diffusion will continue and will obscure all features with time. It is also possible that an equilibrium crystallite size will be reached and the surface structure will remain stable. Many well proven strategies exist to reduce sintering rates in ceramics. They include removal of high diffusion rate impurities and addition of dopants that frustrate sintering. If crystallite growth proves to be a limiting factor for LSM coatings, these strategies could be explored to mitigate crystallite growth.

In addition, further laser treatments can be explored in order to treat a degraded LSM surface and to determine the effect of a second laser treatment on surface structure and optical properties. Various parameters of the laser treatment process can be refined. For instance, the nanosecond laser treatment can be optimized to minimize treatment time and maximize optical properties, such as by varying line width, line spacing, line depth, substrate temperature, etc.

Laser-treated surfaces provide enhanced solar absorptivity. The practicality of this laser-treatment process can be considered. For instance, at a translation speed of 50 mm/sec, one square meter can be treated in 8334 minutes or about 139 hours. The current nanosecond laser technology being explored could allow an individual laser beam to be split into four laser beams, thereby providing translation speeds up to 1 m/s. Assuming four beams/laser and a translation speed of 1 m/s a single laser, can treat one square meter in 104 minutes or ~1.7 hours. Further improvements can include use of multiple lasers. Using eight lasers (32 incident beams), the time to treat one square meter can be reduced to ~13 minutes. At this speed, a 1000 m² tube sheet could be treated in ~217 hours or ~27 eight hour nights. Assuming that the tube sheet can be treated at night, refreshing the surface over the course of a month could be practical.

Other Embodiments

All publications, patents, and patent applications, mentioned in this specification, including U.S. Provisional Application No. 61/945,407, filed Feb. 27, 2014, are incorporated herein by reference to the same extent as if each independent publication or patent application was specifically and individually indicated to be incorporated by reference.

While the invention has been described in connection with specific embodiments thereof, it will be understood that it is capable of further modifications and this application is intended to cover any variations, uses, or adaptations of the invention following, in general, the principles of the invention and including such departures from the present disclosure that come within known or customary practice within the art to which the invention pertains and may be applied to the essential features hereinbefore set forth, and follows in the scope of the claims.

Other embodiments are within the claims.

The invention claimed is:

1. A method of forming a solar absorptive coating on a surface, the method comprising:
   i. applying a ceramic material to the surface to form a coated surface, wherein the ceramic material comprises chromium oxide or a lanthanum-based perovskite; and
   ii. treating the coated surface with a pulsed laser source, wherein the pulsed laser source is selected from the group consisting of a nanosecond laser and femtosecond laser, thereby forming the solar absorptive coating on the surface.

2. The method of claim 1, further comprising, before step ii, curing the ceramic material on the coated surface.

3. The method of claim 1, further comprising, after step ii, re-treating the solar absorptive coating with a pulsed laser source.

4. The method of claim 1, wherein the solar absorptive coating has a solar absorptance of greater than about 0.94 and/or is a high-temperature solar selective coating.

5. The method of claim 1, wherein the solar absorptive coating comprises a plurality of microstructures and a plurality of nanostructures.

6. The method of claim 5, wherein the microstructure comprises a trench having a width of from about 5 μm to about 30 μm and/or a spacing between trenches of from about 20 μm to about 70 μm.

7. The method of claim 1, wherein the pulsed laser source has a pulse width from about 100 fs to about 1000 ns.

8. The method of claim 7, wherein the pulse width is from about 1 ns to about 500 ns.

9. The method of claim 1, wherein the pulsed laser source has a wavelength from about 750 nm to about 1200 nm.

10. The method of claim 1, wherein the pulsed laser source has a pulse energy of more than about 1 mJ.

11. The method of claim 1, wherein the pulsed laser source has an average power of more than about 20 watts.

12. The method of claim 1, wherein the pulsed laser source has a repetition rate of between about 1 kHz to about 500 kHz.

13. The method of claim 1, wherein the pulsed energy source is a nanosecond laser.

14. The method of claim 13, wherein the nanosecond laser has a pulse duration of between about 1 ns to about 400 ns, a wavelength of about 1064 nm, an average power of more than about 20 watts, and/or a repetition rate of about 15 kHz to about 300 kHz.

15. The method of claim 1, wherein the pulsed energy source is a femtosecond laser.

16. The method of claim 15, wherein the femtosecond laser has a pulse energy of more than about 1 mJ, a repetition rate of between about 1 kHz to about 100 kHz, and/or a wavelength of about 800 nm.

17. The method of claim 1, wherein the surface is a substrate for absorption of solar energy selected from the group consisting of a concentrating solar power receiver, a solar tower, a trough, a Stirling engine, a heat absorber, and a solar collector, or a portion thereof.

18. A solar absorptive coating formed by the method of claim 1.

* * * * *